US012099134B2

(12) United States Patent
Yap et al.

(10) Patent No.: US 12,099,134 B2
(45) Date of Patent: Sep. 24, 2024

(54) DEVICES, SYSTEMS, AND METHODS FOR LOCATION TRACKING OR PROXIMITY DETECTION

(71) Applicant: Cadi Scientific Pte Ltd, Singapore (SG)

(72) Inventors: Kon Sang Yap, Singapore (SG); Kim-Gau Ng, Singapore (SG)

(73) Assignee: Cadi Scientific Pte Ltd, Singapore (SG)

( * ) Notice: Subject to any disclaimer, the term of this patent is extended or adjusted under 35 U.S.C. 154(b) by 415 days.

(21) Appl. No.: 17/619,465

(22) PCT Filed: Jun. 18, 2019

(86) PCT No.: PCT/SG2019/050303
§ 371 (c)(1),
(2) Date: Dec. 15, 2021

(87) PCT Pub. No.: WO2020/256630
PCT Pub. Date: Dec. 24, 2020

(65) Prior Publication Data
US 2022/0260668 A1    Aug. 18, 2022

(51) Int. Cl.
*G01S 5/02* (2010.01)
*H04W 4/02* (2018.01)
*H04W 4/029* (2018.01)
(52) U.S. Cl.
CPC .......... *G01S 5/0295* (2020.05); *H04W 4/023* (2013.01); *H04W 4/029* (2018.02)
(58) Field of Classification Search
CPC ...... G01S 5/0295; H04W 4/029; H04W 4/023
(Continued)

(56) References Cited

U.S. PATENT DOCUMENTS 9,087,281 B2    7/2015  Maguire et al.
2009/0106362 A1*  4/2009  Kuhlke ............... H04L 67/06
                                         709/204

(Continued)

FOREIGN PATENT DOCUMENTS

CN    102435990    5/2012
CN    108764776    11/2018
(Continued)

OTHER PUBLICATIONS

International Search Report mailed Sep. 2, 2019 in corresponding PCT/SG2019/050303, 5 pages.
(Continued)

*Primary Examiner* — Ted M Wang
(74) *Attorney, Agent, or Firm* — HOVEY WILLIAMS LLP

(57) ABSTRACT

This invention relates to devices, systems, and methods for location tracking and proximity detection. The invention uses transmitting devices with more than one transmission range. In various embodiments, the invention uses a primary device to transmit a near-range signal and a medium-range signal. In other embodiments, the invention uses a secondary device to receive these signals and, on the basis of the received signals, generate alerts, transmit signals, or do both. In further embodiments, the invention uses another device to provide the location of the secondary device, the primary device, or both devices. This invention may be used for contact tracing, hand hygiene compliance monitoring, and location tracking.

19 Claims, 16 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 2011/0260923 A1 | 10/2011 | Liao et al. | |
| 2012/0268244 A1* | 10/2012 | Ljung | H04L 67/52 |
| | | | 340/5.65 |
| 2014/0125461 A1 | 5/2014 | Liao | |
| 2018/0137316 A1 | 5/2018 | Fischer | |

FOREIGN PATENT DOCUMENTS

| | | |
|---|---|---|
| WO | 02/21429 | 3/2002 |
| WO | 2017/212283 | 12/2017 |

OTHER PUBLICATIONS

CN102435990 Machine Translation, 14 pages.
CN108764776 Machine Translation, 8 pages.

\* cited by examiner

DEVICES, SYSTEMS, AND METHODS FOR LOCATION TRACKING OR PROXIMITY DETECTION

RELATED APPLICATION

This application claims priority to PCT International Patent Application No. PCT/SG2019/050303, filed Jun. 18, 2019, which is hereby incorporated by reference in its entirety.

TECHNICAL FIELD

Various embodiments may relate to a primary device for communication with a secondary device. Various embodiments may relate to a secondary device for communication with a primary device. Various embodiments may relate to a system for location tracking or proximity detection, the system including a primary device and a secondary device. Various embodiments may relate to a method of using a primary device for location tracking or proximity detection. Various embodiments may relate to a method of using a secondary device for location tracking or proximity detection. Various embodiments may relate to a method for location tracking or proximity detection, the method using a primary device and a secondary device.

BACKGROUND

Wireless devices are commonly used for location tracking and proximity detection of personnel and assets.

Location tracking applications typically use a combination of exciters, tags, and receivers. An exciter typically transmits signals to inform other devices of its presence or to trigger or activate other devices. An exciter may contain location information indicating the location of a room or area. When a tag that is designed to receive such signals comes within the transmission range of an exciter and receives a signal containing location information, the tag may transmit a signal containing the same location information. This signal may then be received by one or more signal receivers located in the vicinity of the tag and connected to a monitoring system, enabling the system to know the location of the tag.

Proximity detection applications typically also use a combination of exciters, tags, and receivers. Such applications usually use at least one transmitting device and at least one receiving device. A transmitting device may be an exciter or a tag, and a receiving device may be another tag. In a typical application, when a receiving device comes within the transmission range of a transmitting device and receives one or more signals from the transmitting device, the receiving device may transmit a signal containing information that indicates it has detected the transmitting device. This signal may then be received by one or more signal receivers located in the vicinity of the tag and connected to a monitoring system, enabling the system to monitor the proximity between the receiving device and the transmitting device. The shorter the transmission range of the transmitting device, the closer will be the distance at which the transmitting device can be detected by the receiving device.

In both types of applications, the transmitting devices, whether exciters or tags, are usually single-range, meaning they have only one transmission range.

SUMMARY

Various embodiments may relate to a primary device for communication with a secondary device. Various embodiments may relate to a secondary device for communication with a primary device. Various embodiments may relate to a system for location tracking or proximity detection, the system including a primary device and a secondary device. Various embodiments may relate to a method of using a primary device for location tracking or proximity detection. Various embodiments may relate to a method of using a secondary device for location tracking or proximity detection. Various embodiments may relate to a method for location tracking or proximity detection, the method using a primary device and a secondary device.

In a first embodiment, the invention is a system for location tracking or proximity detection. The system includes a primary device and a secondary device. The primary device is configured to transmit multiple first wireless signals and multiple second wireless signals. Each first wireless signal has a first transmission range and is encoded with a unique signal identifier of the multiple first wireless signals. Each second wireless signal has a second transmission range and is encoded with a unique signal identifier of the multiple second wireless signals. The second transmission range is longer than the first transmission range. The secondary device is configured to store a unique device identifier of the secondary device, receive the multiple first wireless signals when the secondary device is within the first transmission range, and receive the multiple second wireless signals when the secondary device is within the second transmission range.

The primary device may be further configured to store a unique device identifier of the primary device and encode the unique device identifier of the primary device into each of the multiple first wireless signals and each of the multiple second wireless signals. The secondary device may be further configured to identify a contact episode start time of a contact episode as the time at which the secondary device first receives a first wireless signal or a second wireless signal, whichever is received first, from the primary device, the contact episode start time indicating that the secondary device has come within the first transmission range or the second transmission range. The secondary device may be additionally configured to identify a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range. The primary device may be a dual-range patient tag or a dual-range bed exciter, and the secondary device may be a staff tag or a patient tag.

In a second embodiment, the invention is a system for location tracking or proximity detection. The system includes the same primary device and the same secondary device as in the first embodiment. The primary device may be further configured to store a unique device identifier of the primary device and encode the unique device identifier of the primary device into each of the multiple first wireless signals and each of the multiple second wireless signals. The secondary device may be further configured to identify a contact episode start time of a contact episode as the time at which the secondary device first receives a first wireless signal from the primary device, the contact episode start time indicating that the secondary device has come within the first transmission range. The secondary device may be additionally configured to generate one or more alert signals at the end of a second preset period immediately following a first preset period that starts from the contact episode start time, after the secondary device has determined that the time difference between the time at which the secondary device last receives a first wireless signal from the primary device during the first preset period and the contact episode start time is greater than or equal to a preset length of time; alternatively, the secondary device may be additionally configured to generate one or more alert signals at the end of a second preset period immediately following a first preset period that starts from the contact episode start time, after the secondary device has received at least a preset number of first wireless signals from the primary device during the first preset period. The secondary device may be further configured to identify a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range. The primary device may be a dual-range patient tag or a dual-range bed exciter, and the secondary device may be a staff tag.

In a third embodiment, the invention is a system for location tracking or proximity detection. The system includes the same primary device and the same secondary device as in the first embodiment. The primary device may be further configured to store a location identifier associated with the primary device and encode the location identifier into each of the multiple first wireless signals and each of the multiple second wireless signals. The secondary device may be further configured to record a first number representing the number of first wireless signals received by the secondary device during a preset tracking period and record a second number representing the number of second wireless signals received by the secondary device during the preset tracking period. The primary device may be a dual-range exciter, and the secondary device may be a staff tag, a patient tag, or an asset tag.

In a fourth embodiment, the invention is a system for location tracking or proximity detection. The system includes the same primary device and the same secondary device as in the first embodiment. The primary device may be further configured to store a location identifier associated with the primary device and encode the location identifier into each of the multiple first wireless signals and each of the multiple second wireless signals. The secondary device may be further configured to derive the location identifier from at least one of the multiple first wireless signals received by the secondary device but not from any one of the multiple second wireless signals received by the secondary device, and transmit one or more signals each encoded with the unique device identifier of the secondary device and the location identifier; the primary device may be a dual-range bed slot exciter, and the secondary device may be a staff tag, a patient tag, or an asset tag. Alternatively, the secondary device may be further configured to derive the location identifier from at least one of the multiple first wireless signals received by the secondary device or from at least one of the multiple second wireless signals received by the secondary device, and transmit one or more signals each encoded with the unique device identifier of the secondary device and the location identifier; the primary device may be a dual-range bed slot exciter and the secondary device may be a bed exciter.

In a fifth embodiment, the invention is a primary device for communication with a secondary device. The primary device includes a transmitter unit configured to transmit multiple first wireless signals to be received by the secondary device and multiple second wireless signals to be received by the secondary device. Each first wireless signal has a first transmission range and is encoded with a unique signal identifier of the multiple first wireless signals, and each second wireless signal has a second transmission range and is encoded with a unique signal identifier of the multiple second wireless signals. The second transmission range is longer than the first transmission range. The primary device also includes a controller unit coupled to the transmitter unit, the controller unit configured to control the transmitter unit such that the transmitter unit is configured to transmit the multiple first wireless signals and the multiple second wireless signals.

In a sixth embodiment, the invention is a primary device for communication with a secondary device. The primary device includes the same transmitter unit as in the fifth embodiment, the same controller unit as in the fifth embodiment, and a receiver unit coupled to the controller unit. The receiver unit is configured to receive multiple incoming wireless signals from other devices and the controller unit is further configured to control the receiver unit such that the receiver unit is configured to receive the multiple incoming wireless signals from other devices.

In a seventh embodiment, the invention is a secondary device for communication with a primary device. The secondary device is configured to store a unique device identifier of the secondary device. The secondary device is further configured to receive, from the primary device, multiple first wireless signals, each first wireless signal having a first transmission range and encoded with a unique signal identifier of the multiple first wireless signals, when the secondary device is within the first transmission range. The secondary device is additionally configured to receive, from the primary device, multiple second wireless signals, each second wireless signal having a second transmission range and encoded with a unique signal identifier of the multiple second wireless signals, when the secondary device is within the second transmission range. The second transmission range is longer than the first transmission range. The secondary device may include a receiver unit configured to receive at least the multiple first wireless signals and multiple second wireless signals, a transmitter unit configured to transmit multiple outgoing wireless signals, and a controller unit coupled to the receiver unit and the transmitter unit. The controller unit may be configured to control the receiver unit such that the receiver unit is configured to receive at least the multiple first wireless signals and multiple second wireless signals. The controller unit may be further configured to control the transmitter unit such that the transmitter unit is configured to transmit the multiple outgoing wireless signals. The controller unit may be further configured to store the unique device identifier of the secondary device.

In an eighth embodiment, the invention is a method of using a primary device for location tracking or proximity detection. The method includes transmitting, using a transmitter unit of the primary device, multiple first wireless signals to be received by a secondary device, each first wireless signal having a first transmission range and encoded with a unique signal identifier of the multiple first wireless signals. The method also includes transmitting, using the transmitter unit of the primary device, multiple second wireless signals to be received by the secondary device, each second wireless signal having a second transmission range and encoded with a unique signal identifier of the multiple second wireless signals. The second transmission range is longer than the first transmission range.

In a ninth embodiment, the invention is a method of using a secondary device for location tracking or proximity detection. The method includes receiving, using a receiver unit of the secondary device, multiple first wireless signals from a primary device, each first wireless signal having a first transmission range and encoded with a unique signal identifier of the multiple first wireless signals, when the secondary device is within the first transmission range. The method also includes receiving, using the receiver unit of the secondary device, multiple second wireless signals from the primary device, each second wireless signal having a second transmission range and encoded with a unique signal identifier of the multiple second wireless signals, when the secondary device is within the second transmission range. The second transmission range is longer than the first transmission range.

In a tenth embodiment, the invention is a method for location tracking or proximity detection. The method includes transmitting, by a primary device, multiple first wireless signals, each first wireless signal having a first transmission range and encoded with a unique signal identifier of the multiple first wireless signals. The method also includes transmitting, by the primary device, multiple second wireless signals, each second wireless signal having a second transmission range and encoded with a unique signal identifier of the multiple second wireless signals. The method further includes receiving, by a secondary device, the multiple first wireless signals when the secondary device is within the first transmission range. The method additionally includes receiving, by the secondary device, the multiple second wireless signals when the secondary device is within the second transmission range. The second transmission range is longer than the first transmission range.

DETAILED DESCRIPTION

This invention is described by way of embodiments and with reference to the accompanying drawings. These described embodiments are intended to be non-limiting because alternative embodiments or modifications to the described embodiments can be devised by those of ordinary skill in the art without departing from the spirit and scope of the invention.

Unless defined otherwise, all terms have the same meaning as commonly understood by those of ordinary skill in the art, except that the word "may" is used in a permissive sense to express possibility. In addition, an ordinal number—such as first, second, or third—that is used before an element is intended to be used as an adjective to identify the element for easy reference and to differentiate the element from other elements, and is not intended to mandate any numerical order. For example, the first location device, the second location device, and the third location device in this specification are separate devices, and the use of the ordinal numbers in identifying these three location devices does not suggest any relationship between the devices unless otherwise specified, and also does not imply that one location device must come before or after another location device.

Figure 1:
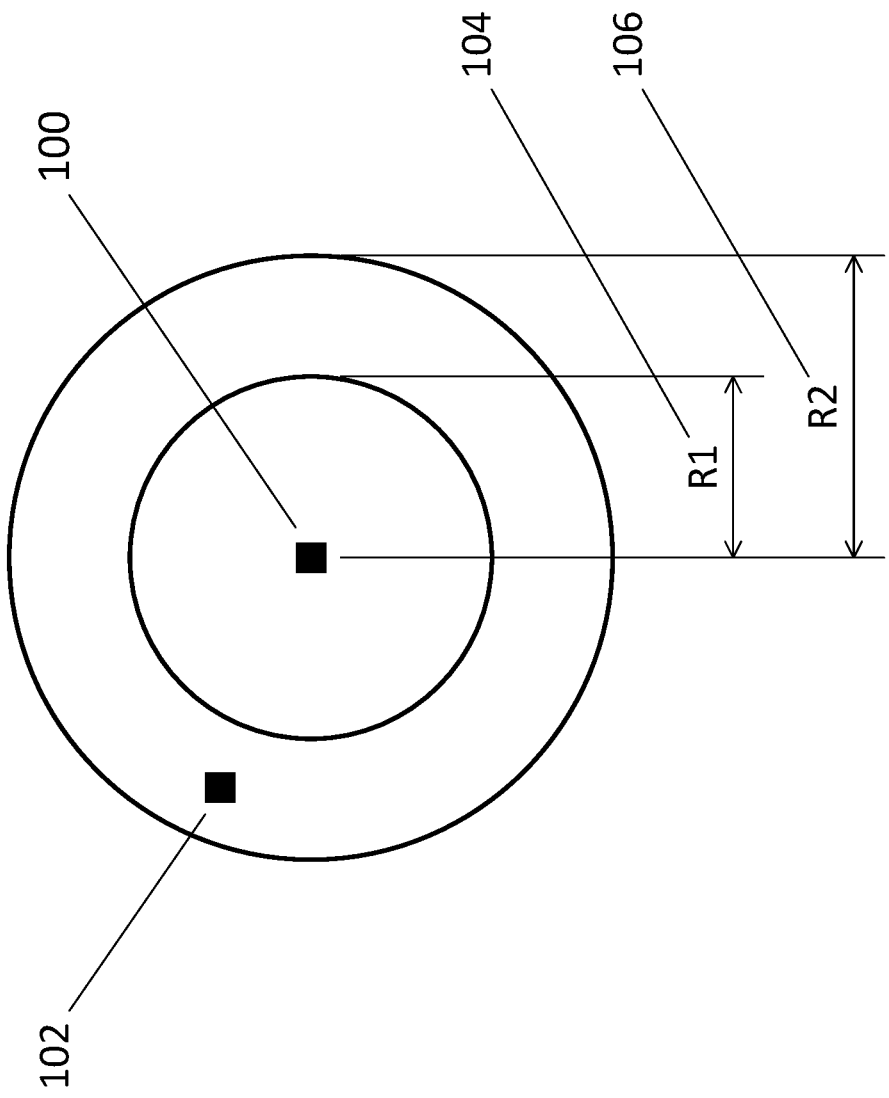
FIG. 1 illustrates a system including a primary device and a secondary device, in accordance with a first embodiment.

First embodiment. In a first embodiment, as illustrated in FIG. 1, the invention is a system for location tracking or proximity detection. The system includes a primary device 100 and a secondary device 102. The primary device 100 is configured to transmit multiple first wireless signals and multiple second wireless signals. Each first wireless signal has a first transmission range R1 104 and is encoded with a unique signal identifier of the multiple first wireless signals. Each second wireless signal has a second transmission range R2 106 and is encoded with a unique signal identifier of the multiple second wireless signals. The second transmission range R2 106 is longer than the first transmission range R1 104. The secondary device 102 is configured to store a unique device identifier of the secondary device 102, receive the multiple first wireless signals when the secondary device 102 is within the first transmission range R1 104, and receive the multiple second wireless signals when the secondary device 102 is within the second transmission range R2 106. The first wireless signals may be considered to be near-range signals, and the second wireless signals may be considered to be medium-range signals. The unique signal identifier of the first wireless signals is different from the unique signal identifier of the second wireless signals; these unique signal identifiers enable a device that has received a (one) first wireless signal or a (one) second wireless signal to uniquely identify the signal or, in other words, to know whether the signal it has received is a first wireless signal or a second wireless signal. The unique device identifier of the secondary device 102 may be used to uniquely identify the secondary device 102. For example, when a signal transmitted by the secondary device 102 is encoded with the unique device identifier of the secondary device 102 and the signal is received by another device, the unique device identifier enables this other device to know, by decoding the signal to derive the unique signal identifier, that the signal it has received has been transmitted by the secondary device 102, or in other words, to identify the secondary device 102. This identification is necessary for location tracking and proximity detection. In general, a unique device identifier of a device may be used to uniquely identify the device.

The first and second wireless signals may be low-frequency (LF) signals with, for example, a radio frequency of 125 kHz. Other frequencies may be used in place of these, depending on the radio frequency regulations of the jurisdiction in which the system is used. In addition, the first and second wireless signals may be infrared (IR) or ultrasound (US) signals, instead of LF signals.

First Embodiment: contact tracing. The system in the first embodiment may, with additional features, be used in hospitals and other patient care facilities for more precise contact tracing of people during outbreaks of communicable diseases. This contact tracing application may be described by reference to FIG. 1. In such an application, and as an aspect of the first embodiment, the primary device 100 may be a dual-range patient tag that is worn on a patient with a communicable disease or a dual-range bed exciter of a bed on which such a patient is resting, and the secondary device 102 may be a staff tag that is worn on a caregiver or a patient tag that is worn on another patient. The first and second transmission ranges 104 106 may be set according to how close the hospital wishes to monitor the contacts between people. For example, if tracing of very close contacts is required for a particular communicable disease, the first transmission range R1 104 may be set to 0.5 m, and if the hospital wishes to trace contacts of people as far as 1.5 m apart, the second transmission range R2 106 may be set to 1.5 m. The primary device 100 may be designed in such a way that the first and second transmission ranges 104 106 are configurable.

Identifying primary device using a unique device identifier. In location tracking and proximity detection, it may be necessary for the primary device 100 to be identified by other devices that receive signals from the primary device 100, so that these other devices know they have come within range of which device. One way to achieve this is to have the primary device 100 store a unique device identifier and encode the unique device identifier into the signals it transmits. Therefore, and as an aspect of the first embodiment, the primary device 100 may be further configured to store a unique device identifier of the primary device 100 and encode the unique device identifier of the primary device 100 into each of the multiple first wireless signals and each of the multiple second wireless signals. A device that receives a first or second wireless signal may derive this unique device identifier by decoding the signal.

Definition of contact episode for contact tracing. In order to enable the secondary device 102 to be monitored, the secondary device 102 may be further configured to send a signal encoded with relevant information to a monitoring system; for easy reference, this signal may be called a monitoring signal. To determine when might be an appropriate time to send this signal, it may be necessary to first define a contact episode and establish when a contact episode starts and when it ends. The various elements of a contact episode 170 for contact tracing are illustrated in FIG. 2.

Start of contact episode for contact tracing. In contact tracing, one may wish to know when the secondary device 102 comes within range of the primary device 100. The start of a contact episode may then be defined as the moment when the secondary device 102 first receives a first or second wireless signal from the primary device 100, whichever is received first, after having not received any signal from the primary device 100, whether the signal is a first wireless signal or a second wireless signal, for at least a certain preset minimum no-signal period. This preset minimum no-signal period may be set to be the same as the preset out-of-range period P-out-ct 178 mentioned later, so as to ensure that the secondary device 102 is not in the midst of an earlier contact episode or has already left an earlier contact episode, if there was any. However, if an application requires that a first wireless signal must be received in order for a contact episode to start, then the start of a contact episode may be defined as the moment when the secondary device 102 first receives a first wireless signal from the primary device 100 after having not received any signal from the secondary device 102 for a certain preset period; one example of such an application is hand hygiene compliance monitoring, which will be explained later. The start of a contact episode may be represented by a contact episode start time T1-ct 172.

End of contact episode for contact tracing. The end of a contact episode may be defined as the moment when the secondary device 102, after having received one or more first or second wireless signals earlier, no longer receives any signal from the primary device 100, whether the signal is a first wireless signal or a second wireless signal, for a certain preset period; for easy reference, this preset period may be called a preset out-of-range period P-out-ct 178, since this period is a period within which the secondary device 102 is outside the second transmission range R2 106, which means the secondary device 102 is also outside the first transmission range R1 104. This preset out-of-range period P-out-ct 178 is intended to ensure that the secondary device 102 has already completely left the transmission ranges of the primary device 100. The monitoring signal may be sent at the end of a contact episode. The end of a contact episode may be represented by a contact episode end time T3-ct 176. An alternative definition is to define the end of a contact episode as the time the secondary device 102 last received a signal from the primary device 100, or equivalently, as the start time T2-ct 174 of the preset out-of-range period P-out-ct 178. However, it may be more practical to use the first definition because, in this definition, the end of a contact episode, which is also the end of the preset out-of-range period P-out-ct 178, can not only be identified in real time during monitoring but can also be used as the moment to make a decision and take action, whereas in the alternative definition, the end of a contact episode can only be established after the preset out-of-range period P-out-ct 178 has passed, which means it would not have been possible to make any decision or take any action at the end of a contact episode. Having said that, the alternative definition may still be useful, especially for data analysis. For the detailed description of this invention, however, the first definition will be used.

Figure 2:
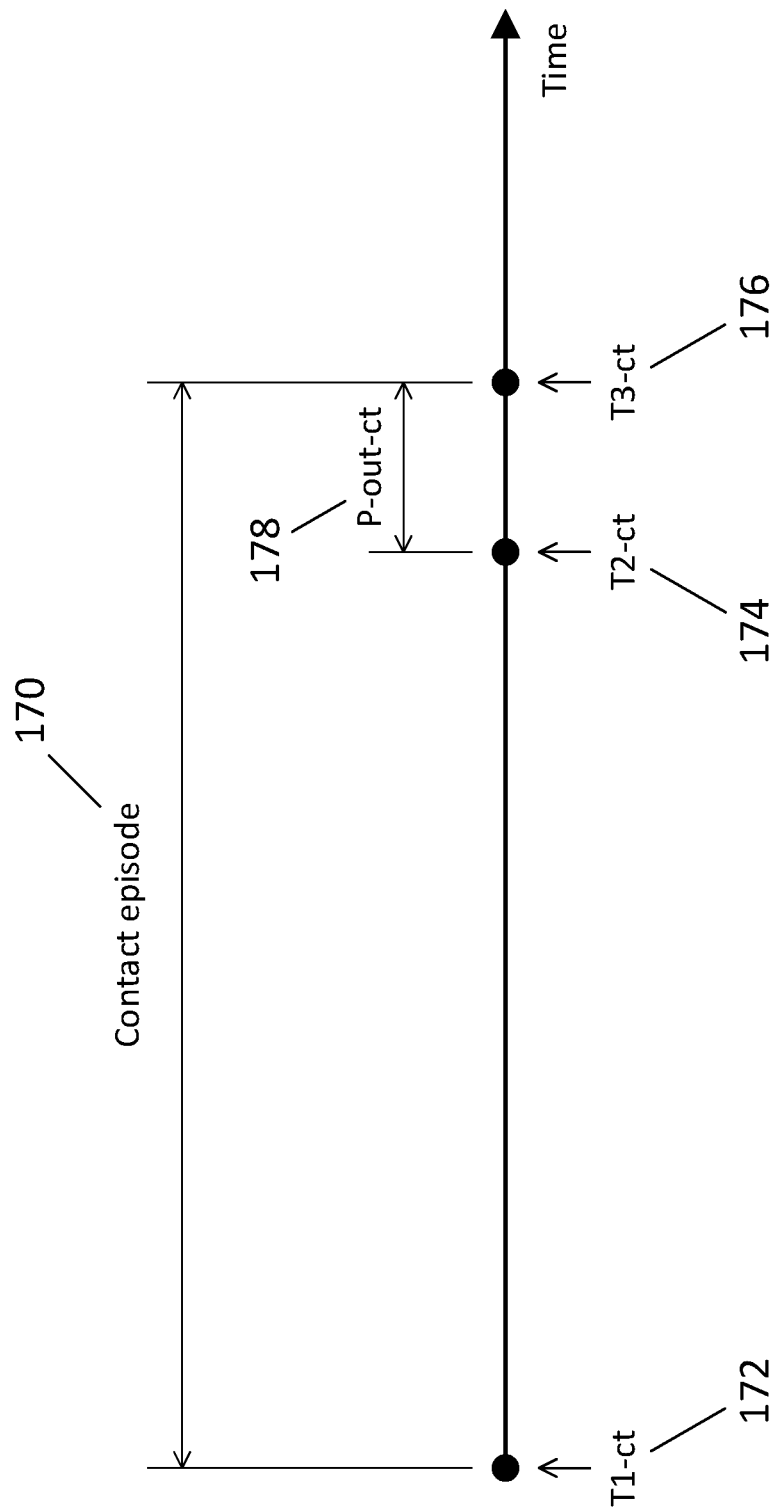
FIG. 2 illustrates various elements related to a contact episode for contact tracing, in accordance with the first embodiment.

FIG. 2 illustrates a contact episode 170 for contact tracing, a contact episode start time T1-*ct* 172, a signal-reception end time T2-*ct* 174, a contact episode end time T3-*ct* 176, and a preset out-of-range period P-out-ct 178. The signal-reception end time T2-*ct* 174 represents the time the secondary device 102 last receives a signal from the secondary device 102 during the contact episode 170, or equivalently, the start time of the preset out-of-range period P-out-ct 178. The period between the contact episode start time T1-*ct* 172 and the signal-reception end time T2-*ct* 174 represents the total period within which signals are received by the secondary device 102, and may be called a signal-reception period.

Therefore, and as an aspect of the first embodiment, the secondary device 102 may be further configured to identify a contact episode start time of a contact episode as the time at which the secondary device 102 first receives a (one) first wireless signal or a (one) second wireless signal, whichever is received first, from the primary device 100, the contact episode start time indicating that the secondary device 102 has come within the first transmission range R1 104 (if a first wireless signal is received first) or the second transmission range R2 106 (if a second wireless signal is received first). In other words, there may be a period (of a predetermined duration) during which the secondary device 102 does not receive any first wireless signal and does not receive any second wireless signal. The secondary device 102 may be configured to identify the time at which it first receives a (one) wireless signal after this period to indicate the start of the contact episode; this wireless signal may be either a (one) first wireless signal or a (one) second wireless signal, whichever is received first. Receiving this wireless signal will indicate that the secondary device 102 has come within the first transmission range R1 104 if the wireless signal is a first wireless signal or within the second transmission range R2 106 if the wireless signal is a second wireless signal. As an aspect of the first embodiment, the secondary device 102 may be further configured to identify a contact episode end time of the contact episode as the end of a preset out-of-range period during which the secondary device 102 does not receive any first wireless signal and does not receive any second wireless signal from the primary device 100, the preset out-of-range period being the period during which the secondary device 102 is outside the second transmission range R2 106. In other words, the end of the preset out-of-range period may be considered by the secondary device 102 to be the end of the contact episode.

Transmission of monitoring signal for contact tracing. As an aspect of the first embodiment, the secondary device 102 may be further configured to transmit a wireless monitoring signal encoded with the unique device identifier of the primary device 100 and the unique device identifier of the secondary device 102 at the contact episode end time. This monitoring signal may be received wirelessly by signal receivers installed in the vicinity of the secondary device 102, then sent to a server of the hospital computer system via a local area network (LAN), and then analyzed by software on the server. This monitoring will be useful, not only for contact tracing but also for other applications that require the secondary device 102 to be monitored; one such other application is hand hygiene compliance monitoring, which will be explained later. The preset out-of-range period may, for example, be any value ranging from 20 seconds to 5 minutes. The secondary device 102 may be designed in such a way that the preset out-of-range period is configurable. The monitoring signal may be an ultra-high frequency (UHF) signal with, for example, a radio frequency of 868.4 MHz, 919.8 MHz, or 925 MHz, or it may be a Wi-Fi signal with, for example, a radio frequency in the 2.4-GHz or 5-GHz band. Other frequencies may be used in place of these, depending on the radio frequency regulations of the jurisdiction in which the system is used.

Transmission intervals for primary device. As an aspect of the first embodiment, the primary device 100 may be further configured to transmit the multiple first wireless signals at first preset transmission intervals and the multiple second wireless signals at second preset transmission intervals. In other words, the interval or period between consecutive first wireless signals may be of a fixed or constant duration, and the interval or period between consecutive second wireless signals may also be of a fixed or constant duration. A first or second preset transmission interval may, for example, be any value ranging from two to 30 seconds. The first preset transmission intervals may be set to be the same as or different from the second preset transmission intervals. The primary device 100 may be designed in such a way that these preset transmission intervals are configurable. When transmitting signals for the first time after a period of no signal transmission, the primary device 100 may be configured to transmit an initial first wireless signal and an initial second wireless signal one after another in any order, with or without any significant time difference. For example, the primary device 100 may be configured to transmit an initial first wireless signal first, and after a time difference of five seconds, transmit an initial second wireless signal, and from then on, transmit the signals in accordance with the preset transmission intervals. The primary device 100 may be designed in such a way that this time difference is configurable. The primary device 100 may be programmed or configured by software through a configuration device interfaced wirelessly to the primary device 100.

For more precise contact tracing, it may be necessary to determine or estimate, from the first and second wireless signals and for each contact episode, how close and how long a person may have had contacts with the patient. One way to achieve this is to consider the number of first wireless signals and the number of second wireless signals received by the secondary device 102. Therefore, and as an aspect of the first embodiment, the secondary device 102 may be further configured to record a first number representing the number of first wireless signals received by the secondary device 102 during the contact episode, record a second number representing the number of second wireless signals received by the secondary device 102 during the contact episode, and encode the first number and the second number into the wireless monitoring signal. These numbers may then be analyzed by the server software. Therefore, and as an aspect of the first embodiment, the system may further include a server configured to determine or estimate, from the first number and the second number, (a) a first total contact time representing the total length of time during which the secondary device 102 has been within the first transmission range R1 104, and (b) a second total contact time representing the total length of time during which the secondary device 102 has been between the first transmission range R1 104 and the second transmission range R2 106. For easy reference, the region within the first transmission range R1 104 may be called the first region, and the region between the first and second transmission ranges 104 106 may be called the second region.

This determination or estimation needs to take into account at least three considerations. First, if, within a certain period, the secondary device 102 is within the first transmission range R1 104, it can receive both the first and second wireless signals, because when the secondary device 102 is within the first transmission range R1 104, it is also within the second transmission range R2 106, since the second transmission range R2 106, being longer than the first transmission range R1 104, necessarily includes the first transmission range R1 104. Second, if, within a certain period, the secondary device 102 is between the first and second transmission ranges 104 106, it can receive only the second wireless signal, because the secondary device 102 is outside the first transmission range R1 104 but within the second transmission range R2 106. Therefore, if only second wireless signals are received within a certain period, the secondary device 102 is most likely between the first and second transmission ranges 104 106 throughout that period. Third, if both first and second wireless signals are received within a certain period, the secondary device 102 may have been within the first transmission range R1 104 throughout that period, or it may have been within the first transmission range R1 104 for part of that period and between the first and second transmission ranges 104 106 for the remaining part of the period.

Analysis of multiple signals. It can be seen from these three considerations that as long as a first wireless signal is received by the secondary device 102, the secondary device 102 may be determined to be within the first transmission R1 104, at least at the time the first wireless signal is received. However, if a second wireless signal is received, the secondary device 102 can be either within the first transmission range R1 104 or between the first and second transmission ranges 104 106, depending on whether a first wireless signal is also received; in particular, if a first wireless signal is also received either before or after the second wireless signal is received, the secondary device 102 may be determined to be possibly within the first transmission range R1 104, but if no first wireless signal is received either before or after the second wireless signal is received, the secondary device 102 may be determined to be possibly between the first and second transmission ranges 104 106. It is generally necessary to analyze multiple signals received by the secondary device 102 over a period in order to determine whether the secondary device 102 is in the first or second transmission region, and it is generally not reliable to carry out this determination on the basis of just one signal received at a particular point in time.

Figure 3:
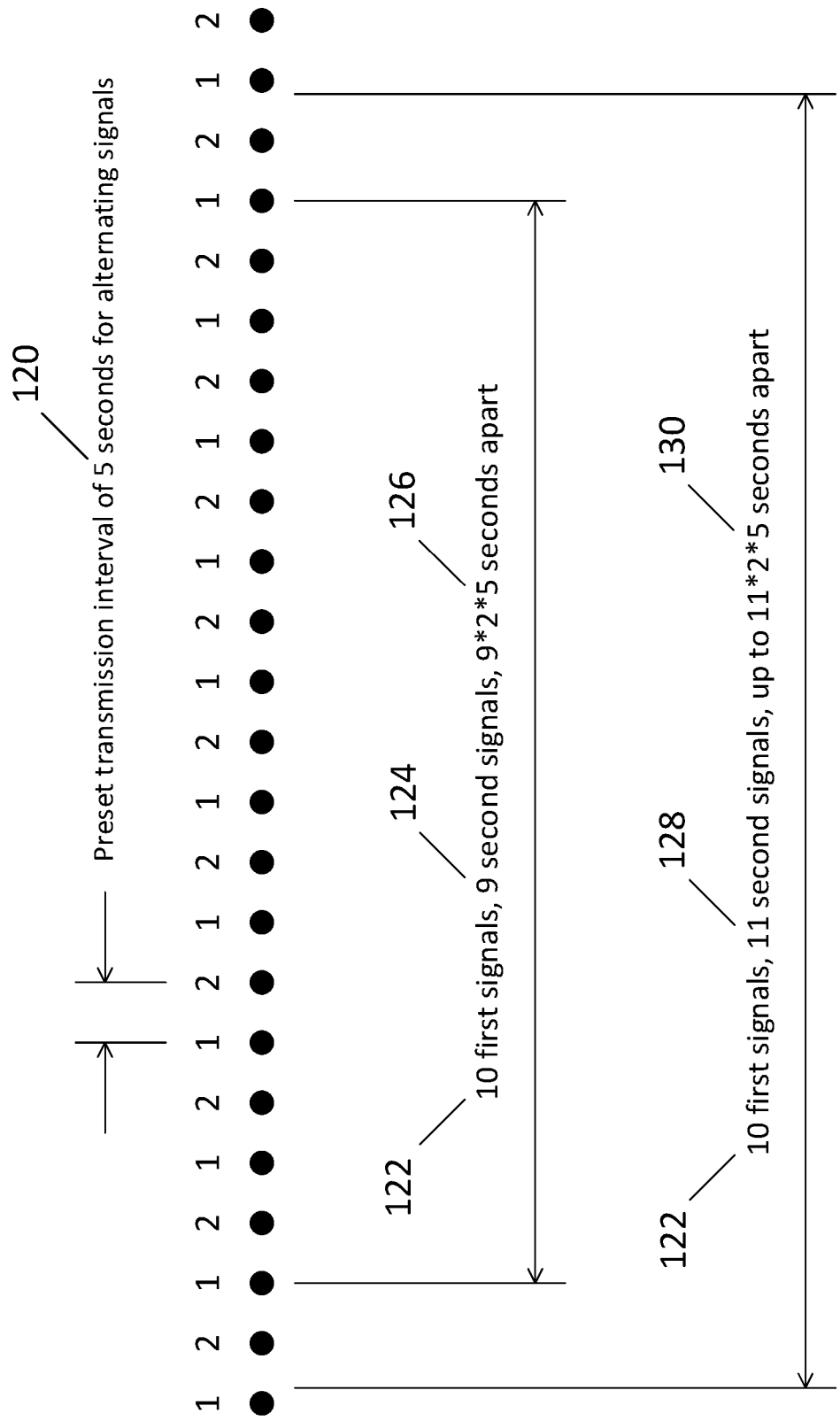
FIG. 3 illustrates the relationship between the number of first wireless signals and the number of second wireless signals when the primary device is within the transmission range of the primary device, in accordance with the first embodiment as applied to contact tracing.

Estimation of contact times: start of description. For example, referring to FIG. 3, assume that the primary device 100 transmits the first and second wireless signals alternately at preset transmission intervals of five seconds 120; in this case, the first and second wireless signals are each transmitted at the same preset transmission intervals of 10 seconds, and the initial time difference between two consecutive signals is also five seconds. Now, consider the situation in which the secondary device 102 was within the first transmission range R1 104 for a continuous period. In this situation, if the secondary device 102 received 10 first wireless signals 122 during that period, it would have received 9 (that is, 10−1) 124 to 11 (that is, 10+1) 128 second wireless signals, depending on when the secondary device 102 entered and left the first transmission range R1 104. In addition, it would have been within the first transmission range R1 104 for a continuous contact time ranging from 9*2*5 seconds 126 to 11*2*5 seconds 130, again depending on when it entered and left the first transmission range R1 104. In general, if the number of first wireless signals is equal or approximately equal to the number of second wireless signals, it is possible that the secondary device 102 has been within the first transmission range R1 104 throughout that period.

Now, consider the situation in which the secondary device 102 was between the first and second transmission ranges 104 106 for a continuous period. In this situation, if the secondary device 102 received 10 second wireless signals during that period, it would have been between the two transmission ranges 104 106 for a continuous contact time ranging from 9*2*5 seconds to 11*2*5 seconds.

Now, consider the situation in which the secondary device 102 was within the first transmission range R1 104 for a first continuous period and between the first and second transmission ranges 104 106 for a second continuous period. In this situation, the secondary device 102 would have received, in addition to first wireless signals, some second wireless signals when it was within the first transmission range R1 104 and the remaining second wireless signals when it was between the first and second transmission ranges 104 106. For example, if the secondary device 102 received 10 first wireless signals and 30 second wireless signals, it would have received 9 to 11 second wireless signals when it was in the first transmission range R1 104 and between 19 (that is, 30−11) and 21 (that is, 30−9) second wireless signals when it was between the first and second transmission ranges 104 106. This means that it would have been between the first and second transmission ranges 104 106 for a continuous contact time ranging from 19*2*5 to 21*2*5 seconds. Necessarily, the total number of second wireless signals must, in this example, be equal to 30. In particular, the following are possible distributions of the first and second wireless signal signals for this example:

(a) Within first transmission range R1 104, 10 first wireless signals, 9 second wireless signals; between first and second transmission ranges 104 106, 21 second wireless signals; total number of second wireless signals, 30.

(b) Within first transmission range R1 104, 10 first wireless signals, 10 second wireless signals; between first and second transmission ranges 104 106, 20 second wireless signals; total number of second wireless signals, 30.

(c) Within first transmission range R1 104, 10 first wireless signals, 11 second wireless signals; between first and second transmission ranges 104 106, 19 second wireless signals; total number of second wireless signals, 30.

Figure 4:
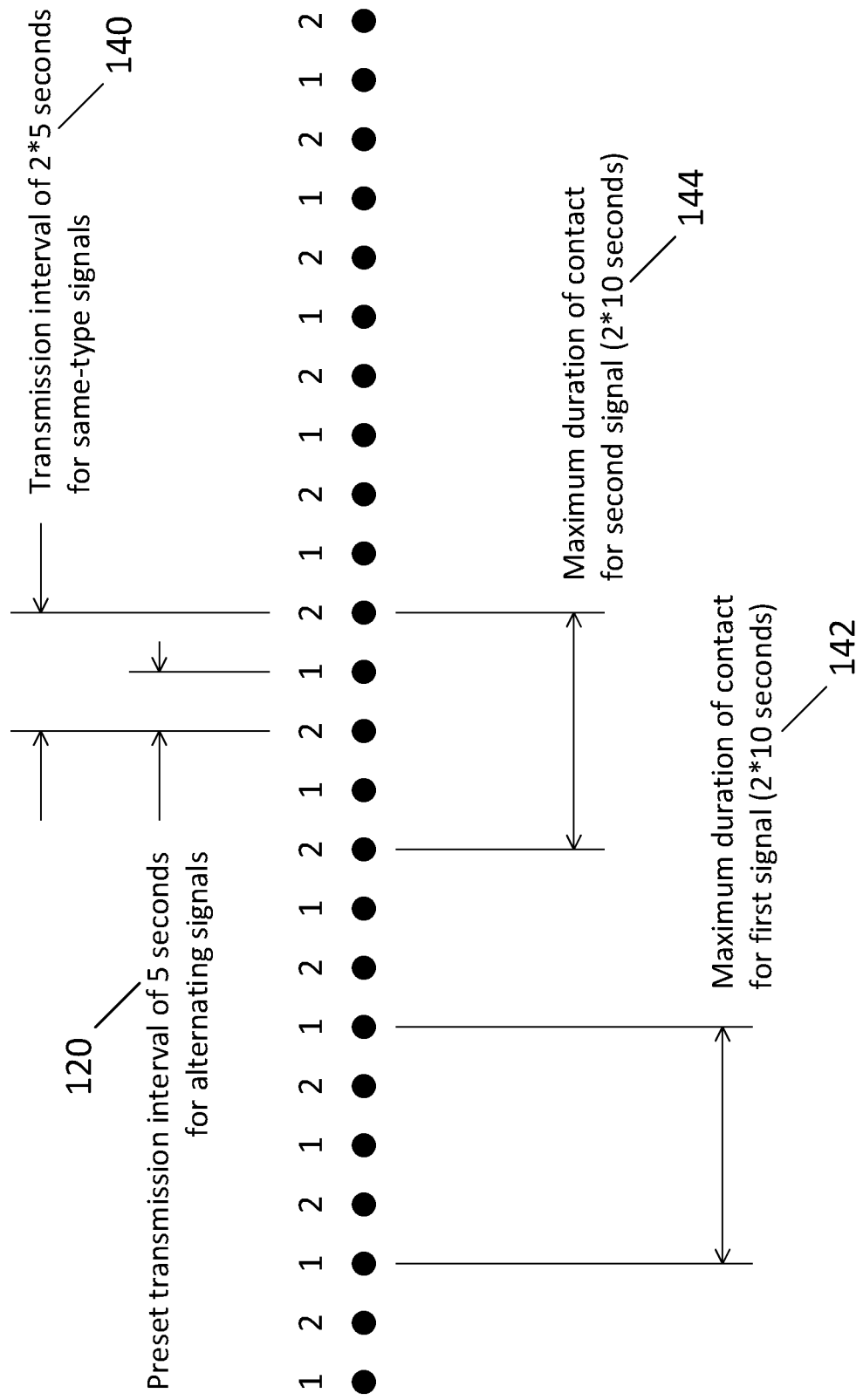
FIG. 4 illustrates the maximum duration of contact for each first wireless signal received and the maximum duration of contact for each second wireless signal received, in accordance with the first embodiment as applied to contact tracing.

However, there will be situations in which the secondary device 102 moves in and out of the first transmission range R1 104. In this situation, it will be necessary to estimate the total contact time when the secondary device 102 was within the first transmission range R1 104 and the total contact time when it was between the first and second transmission ranges 104 106. First, referring to FIG. 4, it may be noted that each transmission interval for same-type signals is two times each preset transmission interval for alternating signals. This means that for a preset transmission interval of 5 seconds 120 for alternating signals, the transmission interval for same-type signals will be 2*5 seconds 140, or 10 seconds. Next, it may be noted that for each signal received by the secondary device 102 in any transmission region, the secondary device 102 would have been in that region for a period of up to two times the transmission interval for that signal, or, for this example, up to 2*10 seconds 142 144, that is, 10 seconds on each side of the time the signal was received. Each first or second wireless signal may then be associated with an average contact time that is half this period, or 10 seconds. Representing the preset transmission interval for alternating signals by T seconds and assuming no missed signals, the following method may then be used to estimate total contact times in a contact episode:

(a) If the secondary device 102 received N first wireless signals, it would have received (N−1) to (N+1) second wireless signal when it was within the first transmission range R1 104. In addition, it would have been within the first transmission range R1 104 for an average total contact time of between (N−1)*2*T seconds and (N+1)*2*T seconds.

(b) If the secondary device 102 also received M second wireless signals, it would have received [M−(N+1)] to [M−(N−1)] second wireless signals when it was between the first and second transmission ranges 104 106. In addition, it would have been between the first and second transmission ranges 104 106 for an average total contact time of between [M−(N+1)−1]*2*T seconds and [M−(N−1)+1]*2*T seconds. Necessarily, the calculated number of second wireless signals cannot be a negative number.

The foregoing estimated contact times may be useful in situations in which a communicable disease can spread through air, in which case closeness and duration of contact between a patient with the disease and a healthy person may affect the chances of the healthy person contracting the disease. In particular, these estimated contact times can help a hospital identify persons who are at a higher risk of contracting the disease, so that it can give priority to managing them.

Estimation of contact times: end of description. The foregoing analysis has been based on the first and second wireless signals being transmitted at the same preset transmission intervals of five seconds, with an initial time difference of five seconds between two consecutive signals, but the same principles used in the analysis can be applied to situations in which the preset transmission intervals are different from five seconds or the time difference is also different from five seconds.

For contact tracing, it may be necessary to know the period within which signals were received by the secondary device 102. Therefore, and as an aspect of the first embodiment, the secondary device 102 may be further configured to record a signal-reception start time identical to the contact episode start time; record a signal-reception end time indicating the time at which the secondary device 102 last receives a (one) first wireless signal or a (one) second wireless signal, whichever is received last, from the primary device 100 during the contact episode; and encode the signal-reception start time and the signal-reception end time into the wireless monitoring signal. These times may then be analyzed by the server software. Therefore, and as an aspect of the first embodiment, the system may further include a server configured to determine or estimate—from the first number, the second number, the signal-reception start time, and the signal-reception end time—(a) a total signal-reception period representing the period within which signals have been received by the secondary device 102 during the contact episode, and (b) a total missed-signal number representing the total number of signals that have been missed by the secondary device 102 during the contact episode. A missed signal may be caused by a malfunction of the primary device 100 or secondary device 102, a blockage of the signal path between the primary device 100 and the secondary device 102, or the primary device 100 having a low battery level, among other possible other factors. The total missed-signal number may be determined or estimated by comparing the period within which signals (that is, the first wireless signals, the second wireless signals, or both) were received by the secondary device 102 against the total number of signals received (that is, the first wireless signals, the second wireless signals, or both) by the secondary device 102; this information may be used to monitor and assess the reliability of the system.

For precise contact tracing, it may be necessary to know, for the first and second wireless signals treated separately, the period within which the signal was received by the secondary device 102. Therefore, and as an aspect of the first embodiment, the secondary device 102 may be further configured to record a first contact start time indicating the time at which the secondary device 102 first receives a (one) first wireless signal from the primary device during the contact episode, record a first contact end time indicating the time at which the secondary device 102 last receives a (one) first wireless signal from the primary device during the contact episode, record a second contact start time indicating the time at which the secondary device 102 first receives a (one) second wireless signal from the primary device during the contact episode, record a second contact end time indicating the time at which the secondary device 102 last receives a (one) second wireless signal from the primary device during the contact episode, and encode the first contact start time, the first contact end time, the second contact start time, and the second contact end time into the wireless monitoring signal. These times may then be analyzed by the server software. Therefore, and as an aspect of the first embodiment, the system may further include a server configured to determine or estimate—from the first number, the second number, the first contact start time, the first contact end time, the second contact start time, and the second contact end time—(a) a first signal-reception period representing the period within which first wireless signals have been received by the secondary device 102 during the contact episode, (a) a second signal-reception period representing the period within which second wireless signals have been received by the secondary device 102 during the contact episode, (a) a first missed-signal number representing the number of first wireless signals that have been missed by the secondary device 102 during the contact episode, and (d) a second missed-signal number representing the number of second wireless signals that have been missed by the secondary device 102 during the contact episode. The first missed-signal number and the second missed-signal number may be determined or estimated by comparing the first number and the second number against the first signal-reception period and the second signal-reception period; this information may be used to monitor and assess the reliability of the system.

Establishing location using a location device during contact tracing. For contact tracing, it may be necessary to know the location of the primary and secondary devices 100 102, whether the devices are in which room or which area. One way to achieve this is to use another device to provide the location; for easy reference, such a device may be called a location device. The location device may be designed to transmit location signals containing location information indicating the location of a room or area; this location information may be in the form of a location identifier. These location signals may then be received by the primary and secondary devices 100 102, which may then decode the signals to derive the location identifier. In this way, the location identifier associated with a location device may be used to represent the location of a room or area. The primary and secondary devices 100 102 must, however, first be designed to receive such location signals. In addition, in order to enable the location of the primary and secondary devices 100 102 to be monitored, it may be necessary for the devices each to send a monitoring signal encoded with the location identifier to a monitoring system.

Figure 5:
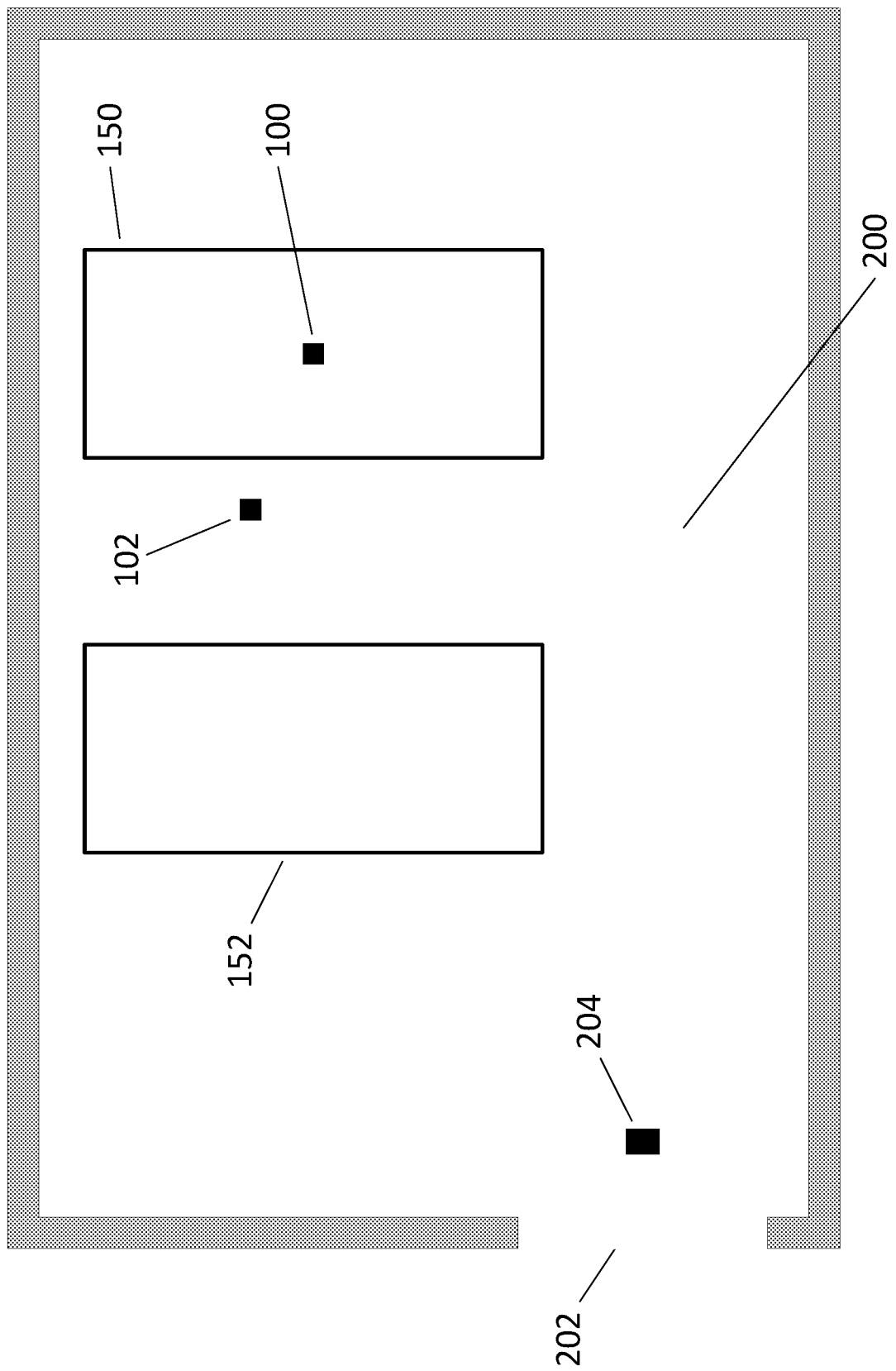
FIG. 5 illustrates a system including a primary device, a secondary device, and a first location device in accordance with the first embodiment.

Therefore, and as an aspect of the first embodiment, the primary device 100 may be further configured to receive multiple incoming wireless signals from other devices. As an aspect of the first embodiment, the system may further include a first location device 204 configured to store a location identifier associated with the first location device 204 and transmit multiple wireless location signals, each wireless location signal having a location signal transmission range and encoded with the location identifier. This embodiment is illustrated in FIG. 5, which includes an enclosed area 200 with a doorway 202, the first bed 150, an adjacent bed 152, and the first location device 204 mounted on the ceiling near the doorway but within the area.

As an aspect of the first embodiment, the primary device 100 may be further configured to receive the multiple wireless location signals when the primary device 100 is within the location signal transmission range, derive the location identifier from at least one of the multiple wireless location signals received by the primary device 100, and transmit a wireless monitoring signal encoded with the unique device identifier of the primary device 100 and the location identifier. As an aspect of the first embodiment, the secondary device 102 may be further configured to receive the multiple wireless location signals when the secondary device 102 is within the location signal transmission range, derive the location identifier from at least one of the multiple wireless location signals received by the secondary device 102, and transmit a wireless monitoring signal encoded with the unique device identifier of the secondary device 102 and the location identifier. The first location device 204 enables the primary and secondary devices 100 102 to establish their location. These monitoring signals effectively report, to the monitoring system, the location of the primary and secondary devices 100 102, enabling the monitoring system to know the location of the devices. These monitoring signals may be transmitted immediately or shortly after the primary and secondary devices 100 102 have received one or more wireless location signals from the first location device 204. These monitoring signals may be received wirelessly by signal receivers installed in the vicinity of the transmitting device (primary device 100 or secondary device 102), then sent to a server of the hospital computer system via a local area network (LAN), and then analyzed by software on the server.

Single-range chokepoint exciter as first location device. As an aspect of the first embodiment, the first location device 204 may be a single-range chokepoint exciter, which may be mounted on the ceiling near the doorway but within an area in which monitoring of hospital staff and patients is to be carried out, or at the side of the doorway. The chokepoint exciter may be powered by a direct current (DC) supply or by Power over Ethernet (PoE) and may be connected to a LAN. The location of the chokepoint exciter may be programmed or configured through the LAN, if the exciter is connected to a LAN; if the exciter is not connected to a LAN, the exciter may be programmed or configured by software through a cable connected to a communication port on the exciter or by software through a configuration device interfaced wirelessly to the exciter. The wireless location signals may be LF signals with the same frequency as that of the first and second wireless signals, or they may be IR or US signals. Depending on where the chokepoint exciter is positioned, the location signal transmission range must be long enough so that if a staff tag of a caregiver, patient tag of a patient, or bed exciter of a bed enters the area, it will come within range of the chokepoint exciter. For example, the location signal transmission range may be any value ranging from 2 m to 5 m. The first location device 204 may be designed in such a way that the location signal transmission range is configurable.

As an aspect of the first embodiment, the first location device 204 may be further configured to transmit the multiple wireless location signals at preset transmission intervals. In other words, the interval or period between consecutive wireless location signals may be of a fixed or constant duration. A preset transmission interval may, for example, be any value ranging from two to five seconds. The first location device 204 may be designed in such a way that the preset transmission intervals are configurable.

Components of primary device. As an aspect of the first embodiment, the primary device 100 may include a transmitter unit configured to configured to transmit at least the multiple first wireless signals and multiple second wireless signals and a controller unit coupled to the transmitter unit. The controller unit may be configured to control the transmitter unit such that the transmitter unit is configured to transmit at least the multiple first wireless signals and multiple second wireless signals; this feature means that the transmitter unit may be further configured to transmit other wireless signals besides the first and second wireless signals, and the controller unit may be further configured to control the transmitter unit such that the transmitter unit is further configured to transmit these other wireless signals. The control provided by the controller unit may include determining the contents of signals to be transmitted by the transmitter unit. If the primary device 100 is configured to store a unique device identifier of the primary device 100, this unique device identifier may be stored in the built-in memory of the controller unit. If the primary device 100 is configured to store a location identifier associated with the primary device 100, this location identifier may be stored also in the built-in memory of the controller unit. The controller unit may be a microcontroller.

As an aspect of the first embodiment, the primary device 100 may further include a receiver unit coupled to the controller unit of the primary device 100. The receiver unit may be configured to receive multiple incoming wireless signals from other devices and the controller unit may be further configured to control the receiver unit such that the receiver unit is configured to receive the multiple incoming wireless signals. The control provided by the controller unit may include processing the signals, such as decoding the signals, received by the receiver unit and determining how to respond to the received signals.

Components of secondary device. As an aspect of the first embodiment, the secondary device 102 may include a receiver unit configured to receive at least the multiple first wireless signals and multiple second wireless signals, a transmitter unit configured to transmit multiple outgoing wireless signals, and a controller unit coupled to the receiver unit and the transmitter unit. The controller unit may be configured to control the receiver unit such that the receiver unit is configured to receive at least the multiple first wireless signals and multiple second wireless signals; this feature means that the receiver unit may be further configured to receive other wireless signals besides the first and second wireless signals, and the controller unit may be further configured to control the receiver unit such that the receiver unit is further configured to receive these other wireless signals. The controller unit may be further configured to control the transmitter unit such that the transmitter unit is configured to transmit the multiple outgoing wireless signals. The controller unit may be further configured to store the unique device identifier of the secondary device 102. The control provided by the controller unit may include processing the signals, such as decoding the signals, received by the receiver unit, and determining how to respond to the received signals, and determining the contents of signals to be transmitted by the transmitter unit. The unique device identifier of the secondary device 102 may be stored in the built-in memory of the controller unit. The controller unit may be a microcontroller.

Second embodiment: hand hygiene compliance monitoring. The primary and secondary devices 100 102 in the first embodiment may, with additional features, also be used in hospitals and other patient care facilities to detect and monitor proximity between hospital staff and patients for hand hygiene compliance monitoring. This hand hygiene compliance monitoring application may be described in a second embodiment and by reference to FIG. 6, which includes the adjacent bed 152 of the same size as the first bed 150. The bed length is L 154 and the bed width is W 156. The width of the space between the two beds is D1 158. In such an application, and as an aspect of the second embodiment, the primary device 100 may be a dual-range patient tag that is worn on a patient on the first bed 150 or a dual-range bed exciter that is mounted under the first bed 150 or, and the secondary device 102 may be a staff tag that is worn on a caregiver.

When a caregiver comes within the first transmission range R1 104 of the bed exciter or patient tag, which also means that the caregiver is also within the second transmission range R2 106 of the bed exciter or patient tag, there is a chance that the caregiver plans to have physical contact with the patient, and that may be an appropriate time to remind the caregiver to observe hand hygiene compliance by washing her hands before touching the patient, by having the staff tag generate one or more alert signals, which may be audible, visual, or both. When the caregiver was earlier within the first transmission range R1 104 and is later outside the second transmission range R2 106 for a certain period, the caregiver is likely to have left the bed, and that may be an appropriate time to remind the caregiver to observe hand hygiene compliance by washing her hands after possibly having physical contact with the patient earlier, by also having the staff tag generate one or more alert signals.

Figure 7:
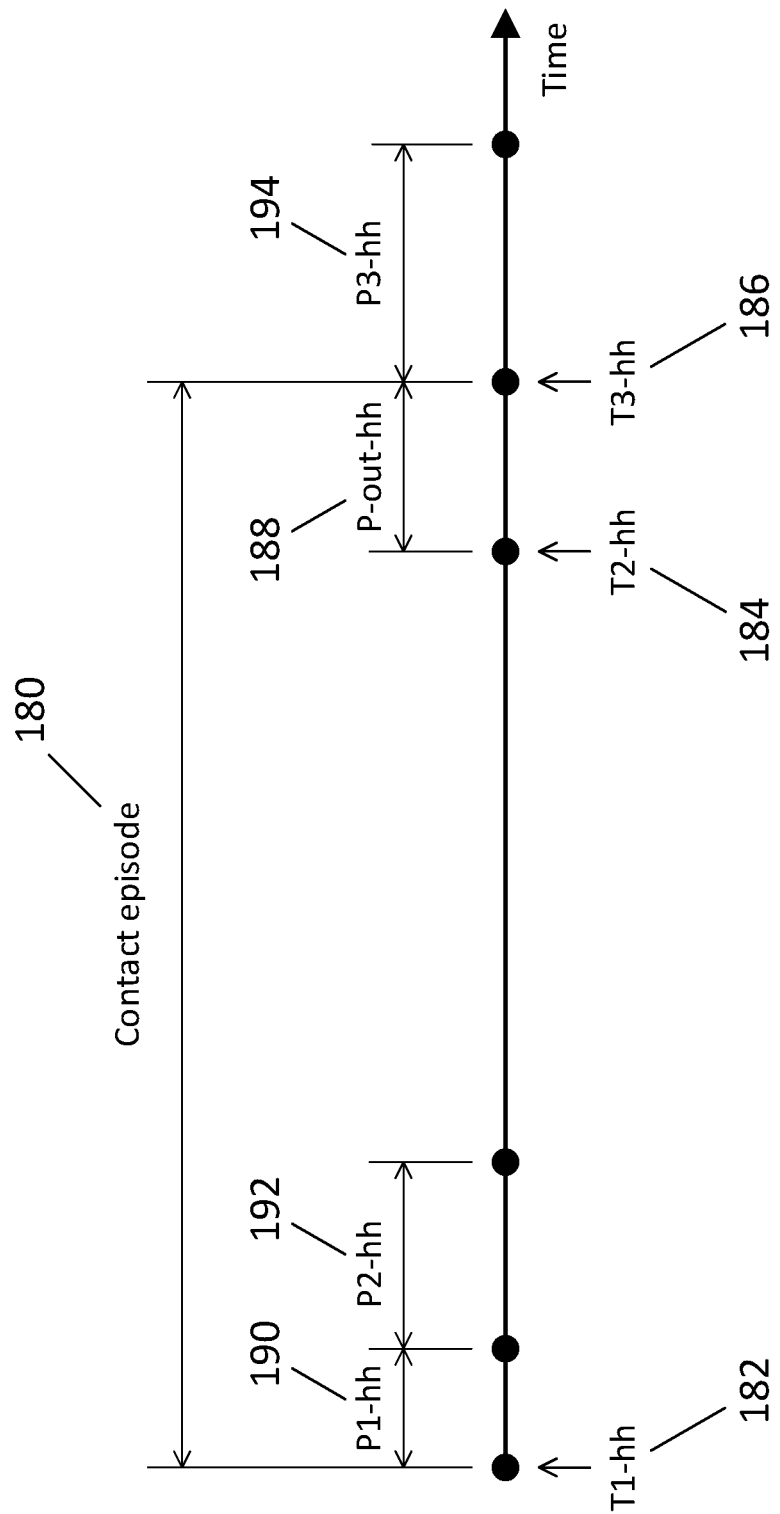
FIG. 7 illustrates various elements related to a contact episode for hand hygiene compliance monitoring, in accordance with the second embodiment.

Definition of contact episode for hand hygiene compliance monitoring. It may be appropriate at this point to define, for hand hygiene compliance monitoring, a contact episode and establish when a contact episode starts and when it ends. The various elements of a contact episode 180 for hand hygiene compliance monitoring are illustrated in FIG. 7.

Start of contact episode for hand hygiene compliance monitoring. In hand hygiene compliance monitoring, one may wish to know when the secondary device 102 comes within the first transmission range R1 104 of the primary device 100, as the caregiver is closest to the bed or patient on the bed when she is within this range. The start of a contact episode, which may be represented by a contact episode start time T1-*hh* 182, may then be defined as the moment when the secondary device 102 first receives a first wireless signal from the primary device 100, after having not received any signal from the primary device 100, whether the signal is a first wireless signal or a second wireless signal, for at least a certain preset minimum no-signal period. This preset minimum no-signal period may be set to be the same as the first preset period P1-*hh* 190 mentioned later if the secondary device 102 has earlier identified a contact episode start time T1-*hh* 182 but has not yet ascertained that it is a valid contact episode start time; the validity of a contact episode start time for hand hygiene compliance monitoring is explained later in the paragraph titled "Generation of alert signals when caregiver is within first transmission range" and the paragraph titled "Determining whether caregiver is within first transmission range". If the secondary device 102 has earlier identified a valid contact episode start time but has not yet identified a contact episode end time T3-*hh* 186 (meaning the secondary device 102 is still in the midst of a contact episode) or if the secondary device 102 has not yet identified any contact episode start time, this preset minimum no-signal period may be set to be the same as the preset out-of-range period P-out-hh 194 mentioned later, so as to ensure that the secondary device 102 is not in the midst of an earlier contact episode or has already left an earlier contact episode, if there was any.

End of contact episode for hand hygiene compliance monitoring. The end of a contact episode, which may be represented by a contact episode end time T3-*hh* 186, may be defined in a way similar to that described earlier in the paragraph titled "End of contact episode for contact tracing", as the moment when the secondary device 102, after having received one or more first wireless signals earlier, no longer receives any signal from the primary device 100, whether the signal is a first wireless signal or a second wireless signal, for a certain preset period; for easy reference, this preset period may be called a preset out-of-range period P-out-hh 188, since this period is a period within which the secondary device 102 is outside the second transmission range R2 106, which means the secondary device 102 is also outside the first transmission range R1 104. This preset out-of-range period P-out-hh 188 is intended to ensure that the secondary device 102 has already completely left the transmission ranges of the primary device 100.

Generation of alert signals when caregiver is within first transmission range. Once the start of a contact episode has been identified or, equivalently, once the secondary device 102 comes within the first transmission range R1 104 of the primary device 100, alert signals to remind the caregiver to wash her hands may be generated at the start of the contact episode. However, it may be necessary, before generating any alert signals, to ensure that the caregiver is within the first transmission range R1 104 for a preset period that is reasonably long enough to suggest possible physical contact between the caregiver and the patient; for easy reference, this preset period may be called a first preset period P1-*hh* 190. In other words, it may be necessary to ensure that the secondary device 102 continues to receive first wireless signals for a period equal or approximately equal to the first preset period P1-*hh* 190, so as to suggest possible physical contact between the caregiver and the patient and, hence, warrant the need to generate alert signals to remind the caregiver to wash her hands. In other words, a contact episode start time that has been identified is only valid if the secondary device 102 continues to be within the first transmission range R1 104 for a reasonably long period.

Determining whether caregiver is within first transmission range. One way to ensure that the caregiver is within the first transmission range R1 104 for a reasonably long period is to require that the time difference between (a) the time at which the secondary device 102 last received a first wireless signal during the first preset period and (b) the start time of the contact episode is greater than or equal to a preset length of time. Another way is to require the secondary device 102 to receive at least a preset number of first wireless signals during the first preset period. The value of this preset number of first wireless signals will depend on the length of the first preset period, the frequency of transmission of the first wireless signals, and the probability of missed signals, among other factors. Both ways may be used together.

Alert signals may be generated at the end of the first preset period P1-*hh* 190, or at the end of a further preset period following the first preset period; for easy reference, this further preset period may be called a second preset period P2-*hh* 192. This second preset period P2-*hh* 192 may be used as a grace period to allow time for the caregiver to make an effort to wash her hands before alert signals are generated. If alert signals are generated at the end of the second preset period P2-*hh* 192, that would mean that the alert signals are generated after a combined period equal to the sum of the first and second preset periods P1-*hh* 190 P2-*hh* 192 has lapsed since the start of the contact episode.

The secondary device 102 may be configured in such a way that if, after it has first received a first wireless signal, it does not receive any more first wireless signals for a period equal to the first preset period P1-*hh* 190, suggesting that the caregiver has left the first transmission range R1 104, it will interpret that there is a low probability of contact between the caregiver and the patient and, hence, will not generate any alert signals. In such a situation, the secondary device 102 may be further configured to abandon the previously identified contact episode start time T1-*hh* 182, and re-identify a new contact episode start time when the secondary device 102 comes within the first transmission range R1 104 again.

Generation of alert signals after a contact episode. Once the end of a contact episode has been identified, alert signals to remind the caregiver to wash her hands may be generated at the end of the contact episode, which is also the end of the preset out-of-range period P-out-hh 188. Alternatively, they may be generated at the end of a further preset period following the preset out-of-range period P-out-hh 188; for easy reference, this further preset period may be called a third preset period P3-*hh* 194. This third preset period P3-*hh* 194 may be used as a grace period to allow time for the caregiver to make an effort to wash her hands before alert signals are generated. If alert signals are generated at the end of a third preset period P3-*hh* 194, that would mean that that the alert signals are generated after a combined period equal to the sum of the preset out-of-range period P-out-hh 188 and the third preset period P3-*hh* 194 has lapsed.

FIG. 7 illustrates a contact episode 180 for hand hygiene compliance monitoring, a contact episode start time T1-*hh* 182, a signal-reception end time T2-*hh* 184, a contact episode end time T3-*hh* 186, a preset out-of-range period P-out-hh 188, a first preset period P1-*hh* 190, a second preset period P2-*hh* 192, and a third preset period P3-*hh* 194. The signal-reception end time T2-*hh* 184 represents the time the secondary device 102 last receives a signal from the secondary device 102 during the contact episode, or equivalently, the start time of the preset out-of-range period P-out-hh 188. The period between the contact episode start time T1-*hh* 182 and the signal-reception end time T2-*hh* 184 represents the total period within which signals are received by the secondary device 102, and may be called a signal-reception period.

Figure 6:
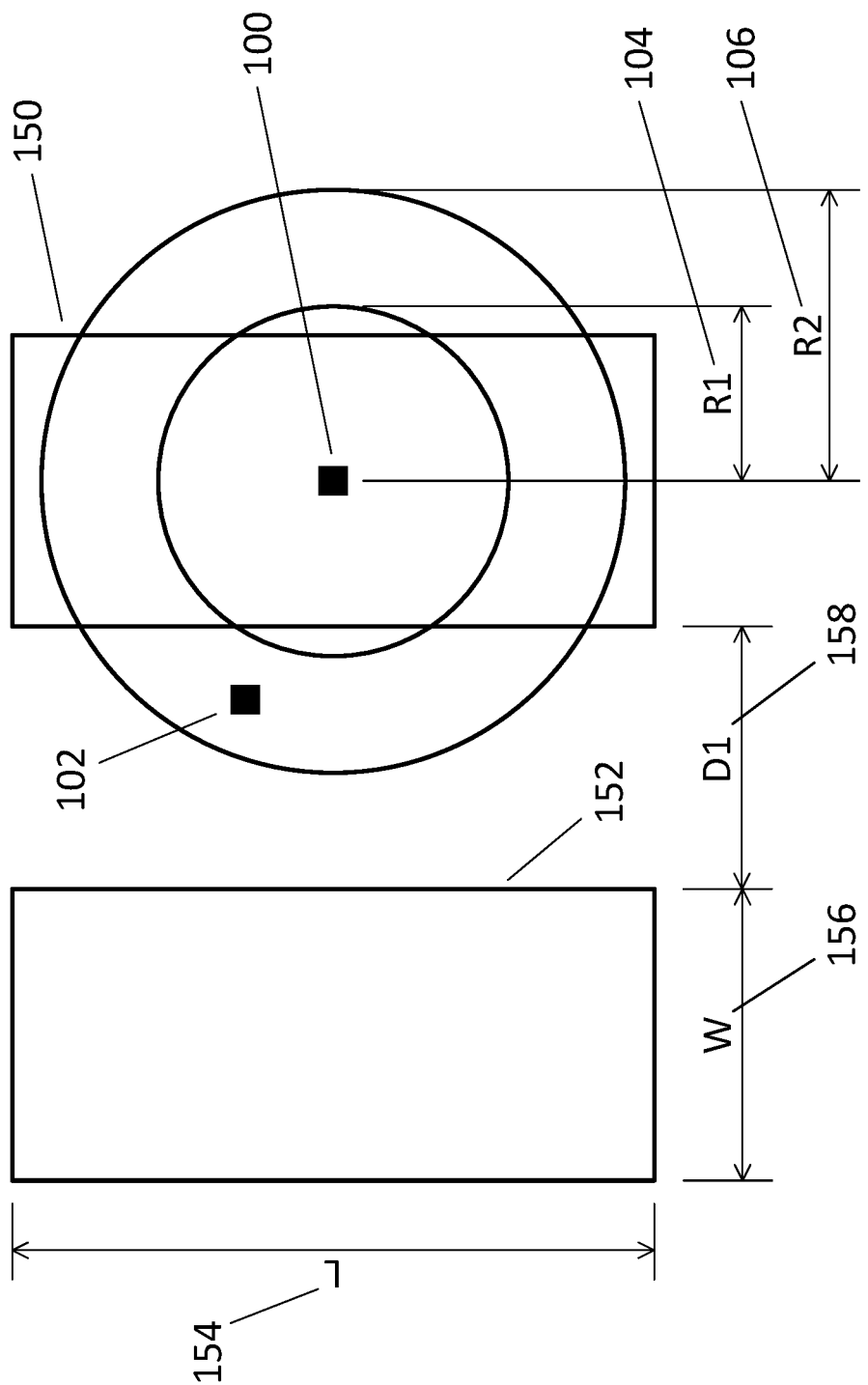
FIG. 6 illustrates a system including a primary device and a secondary device, in accordance with a second embodiment as applied to hand hygiene compliance monitoring.

Therefore, in the second embodiment, as illustrated in FIG. 6, the invention is a system for location tracking or proximity detection. The system includes the same primary device 100 and the same secondary device 102 as in the first embodiment. The primary device 100 may be further configured to store a unique device identifier of the primary device 100 and encode the unique device identifier of the primary device 100 into each of the multiple first wireless signals and each of the multiple second wireless signals. As an aspect of the second embodiment, the secondary device 102 may be further configured to identify a contact episode start time of a contact episode as the time at which the secondary device 102 first receives a (one) first wireless signal from the primary device 100, the contact episode start time indicating that the secondary device 102 has come within the first transmission range R1 104. In other words, there may be a period (of a predetermined duration) during which the secondary device 102 does not receive any first wireless signal. The secondary device 102 may be configured to identify the time at which it first receives a (one) first wireless signal after this period to indicate the start of the contact episode. Receiving this first wireless signal will indicate that the secondary device 102 has come within the first transmission range R1 104. As an aspect of the second embodiment, the secondary device 102 may be further configured to identify a contact episode end time of the contact episode as the end of a preset out-of-range period during which the secondary device 102 does not receive any first wireless signal and does not receive any second wireless signal from the primary device 100, the preset out-of-range period being the period during which the secondary device 102 is outside the second transmission range R2 106. In other words, the end of the preset out-of-range period may be considered by the secondary device 102 to be the end of the contact episode. The preset out-of-range period may, for example, be any value ranging from 20 seconds to 5 minutes. The secondary device 102 may be designed in such a way that the preset out-of-range period is configurable to cater to the needs of the application.

As an aspect of second embodiment, the secondary device 102 may be further configured to generate one or more alert signals at the end of a second preset period immediately following a first preset period that starts from the contact episode start time, after the secondary device 102 has determined that the time difference between (a) the time at which the secondary device 102 last receives a (one) first wireless signal from the primary device during the first preset period and (b) the contact episode start time is greater than or equal to a preset length of time. In other words, the secondary device 102 may be configured to identify the time at which the secondary device 102 receives the last first wireless signal during the first preset period (that is, the first wireless signal that is last received during the first preset period). Upon determining that the time difference between the contact episode start time and the time at which the secondary device 102 receives the last first wireless signal during the first preset period is equal to or exceeds the preset length of time, the secondary device 102 may be configured to generate one or more alert signals at the end of a second preset period immediately after the first preset period. As an aspect of the second embodiment, the secondary device 102 may be further configured to generate one or more alert signals at the end of a second preset period immediately following a first preset period that starts from the contact episode start time, after the secondary device 102 has received at least a preset number of first wireless signals from the primary device during the first preset period. The first preset period may, for example, be any value ranging from 5 to 30 seconds. The second preset period may, for example, be any value ranging from 30 to 60 seconds. The preset length of time may be set to a certain percentage of the length of the first preset period; this percentage may, for example, be any percentage value ranging from 60% to 80%. The secondary device 102 may be designed in such a way that the first preset period, the second preset period, the preset length of time, and the preset number of first wireless signals are configurable to cater to the needs of the application. For example, if the first preset period is set to zero, if justified by the application, the preset number of first wireless signals may be set to one, which would refer to the first wireless signal that is received by the secondary device 102 at the start of a contact episode. As another example, if the first and second preset periods are, if justified by the application, both be set to zero, alert signals would be generated immediately at the start of a contact episode. Various combinations of quantities for the first and second preset periods are possible.

As an aspect of the second embodiment, the secondary device 102 may be further configured to generate one or more alert signals at the end of a third preset period immediately following the preset out-of-range period. The third preset period may, for example, be any value ranging from 30 seconds to 5 minutes. The secondary device 102 may be designed in such a way that the third preset period is configurable to cater to the needs of the application. For example, if the third preset period is set to zero, if justified by the application, alert signals would be generated immediately at the end of a contact episode.

According to the World Health Organization (WHO), washing hands before touching a patient is referred to as Hand Hygiene Moment 1, and washing hands after touching a patient is referred to as Hand Hygiene Moment 4 (see "WHO Guidelines on Hand Hygiene in Health Care", published in 2009 by WHO). The generation of alert signals at the end of the first or second preset period may, for easy reference, be called an M1 hand hygiene event, and the generation of alert signals at the end of the third preset period may be called an M4 hand hygiene event.

In relation to these WHO hand hygiene moments, it may be appropriate at this point to explain the advantages using a dual-range bed exciter or dual-range patient tag. It is possible to use a single-range bed exciter or single-range patient tag that transmits only the first wireless signal, which has the shorter transmission range. However, at one moment the caregiver may be within the first transmission range R1 104 when talking with or assessing the patient, and at the next moment she may be out of the first transmission range R1 104 when looking at the patient monitor, recording some notes, or discussing the patient's case with fellow caregivers or the patient's relatives. This means that the caregiver may be moving in and out of the first transmission range R1 104, and it can then be difficult to know when the caregiver has left the bed. The use of the second wireless signal can help to resolve this difficulty, by enabling the staff tag worn by the caregiver to know that the caregiver has left the bed once she has been outside the second transmission range R2 106 for a certain period. In this way, the use of a bed exciter or patient tag with two transmission ranges can help the staff tag to determine when a caregiver may be having physical contact with a patient on a bed and when a caregiver has already left the bed, so that appropriate alert signals can be generated to remind the caregiver to wash her hands.

It is also possible to use a bed exciter or patient tag that transmits, as a compromise, only one signal with a transmission range that is somewhere between the first and second transmission ranges 104 106. However, this approach may lead to the staff tag receiving a signal from the bed exciter or patient tag and subsequently generating alert signals to remind the caregiver to wash her hands, when in fact the caregiver is not close enough to the patient to be able to have physical contact with the patient. The use of a bed exciter or patient tag with two transmission ranges can help to prevent this from happening.

For this hand hygiene compliance monitoring application, the first transmission range R1 104 may be set in such a way that it covers at least half the bed width W 156 so that it can be received by the staff tag (secondary device 102) of a caregiver standing close to the bed. For example, if the bed width W 156 is 1 m, the first transmission range R1 104 may be set to 0.6 m. If the primary device 100 is a patient tag that is worn on a patient, the second transmission range R2 106 may be set in such a way that it covers at least half the bed width W 156 plus a distance big enough to accommodate a standing caregiver, so that it can be received by the staff tag of a caregiver standing next to the bed. For example, this distance may be set to 0.5 m, which should comfortably accommodate a big person, such that the second transmission range R2 106 may be set to half the bed width W 156 plus this distance, or equivalently, 0.5 m plus 0.5 m, or 1 m. If the primary device 100 is a bed exciter that is fixed in position at the center of the bed, the second transmission range R2 106 may be set in such a way that it covers at least half the bed length L 154. In general, it may be necessary to limit the second transmission range R2 106 in such a way that the second wireless signals do not interfere with other devices in the vicinity of the primary device 100, including those devices associated with an adjacent bed. The primary device 100 may be designed in such a way that the first and second transmission ranges 104 106 are configurable.

Transmission of monitoring signal for hand hygiene compliance monitoring. In order to enable the secondary device 102 to be monitored, the secondary device 102 may, like for contact tracing, be further configured to send a monitoring signal encoded with relevant information to a monitoring system. Like for contact tracing, this monitoring signal may be sent at the end of a contact episode. Therefore, and as an aspect of the of the second embodiment, the secondary device 102 may be further configured to transmit a wireless monitoring signal encoded with the unique device identifier of the primary device 100 and the unique device identifier of the secondary device 102 at the contact episode end time.

For hand hygiene compliance monitoring, a critical period within a contact episode is one that starts from the time the caregiver comes within the first transmission range R1 104 for the first time and ends when the caregiver leaves the second transmission range R2 106. Therefore, and as an aspect of the first embodiment, the secondary device 102 may be further configured to record a contact start time identical to the contact episode start time; record a contact end time indicating the time at which the secondary device 102 last receives a (one) first wireless signal or a (one) second wireless signal, whichever is received last, from the primary device 100 during the contact episode; and encode the contact start time and the contact end time into the wireless monitoring signal. These times may then be analyzed by the server software. Therefore, and as an aspect of the second embodiment, the system may further include a server configured to determine or estimate, from the contact start time and the contact end time, a total signal-reception period representing the period within which signals have been received by the secondary device 102 during the contact episode.

The system in this hand hygiene compliance monitoring application may be used with one or more handwashing devices, such as liquid soap or alcohol gel dispensers, each with a motion-sensing exciter installed within the device, on the device, or in the vicinity of the device. This motion-sensing exciter may be stored with a unique device identifier and configured to transmit a signal, which may be called a handwashing trigger signal for easy reference, when it senses a handwashing motion. This trigger signal may contain the unique device identifier of the motion-sensing exciter and a location identifier identifying the location of the motion-sensing exciter; this trigger signal may be an LF signal with the same frequency as that of the first and second wireless signals, or it may be an IR or a US signal. The staff tag may be configured to receive this handwashing trigger signal, record the time it received this trigger signal, and then transmit a signal, which may be called a handwashing monitoring signal for easy reference, containing the unique device identifier of the motion-sensing exciter, the unique device identifier of the staff tag, and the location identifier identifying the location of the motion-sensing exciter. This handwashing monitoring signal may be a UHF or Wi-Fi signal with the same frequency as that of the other monitoring signals mentioned in this specification. Like those other monitoring signals, this handwashing monitoring signal may be received wirelessly by signal receivers installed in the vicinity of the staff tag, then sent to a server on the hospital computer system via a LAN, and then analyzed by software on the server.

The staff tag's record of the time transmitted by the motion-sensing exciter may be used to serve as a record of a handwashing event to help the tag decide whether or not to generate alert signals to remind the caregiver to wash her hands. For example, the staff tag may be configured in such way that when it first receives the first wireless signal, it will generate alert signals only if it has no record of any handwashing event during a fourth preset period immediately before the start of a contact episode when it first received the first wireless signal, and during the first or second preset period following the start of a contact episode. This can help to ensure that if the caregiver does wash her hands during the fourth preset period before she approaches a patient on a bed or if she does wash her hands during the first or second preset period following the start of a contact episode, the staff tag will not need to generate alert signals to remind the caregiver to wash her hands. Similarly, the staff tag may be configured in such a way that it will generate alert signals at the end of the third preset period only if it has no record of any handwashing event during the preset out-of-range period or the third preset period. Therefore, the staff tag may be further configured to store the time a handwashing event last took place.

For each hand hygiene moment (M1 or M4), the staff tag may be further configured to generate one or more reminder alert signals if the caregiver has not performed any handwashing within a fifth preset period from the time alert signals were last generated by the staff tag, in case the caregiver forgets to wash her hands even after the receiving alert signals earlier. The staff tag may continue to generate such reminder signals until it encounters a record of a handwashing event, or equivalently, until the caregiver washes her hands. Therefore, the staff tag may be further configured to store the time it last generated alert signals. Alternatively, the staff tag may be configured to simply generate alert signals at preset intervals following the time alert signals were first generated by the staff tag for a hand hygiene event (M1 or M4), until the staff tag encounters a record of a handwashing event, or equivalently, until the caregiver washes her hands. Other methods of scheduling the generation of reminder alert signals may be used.

Establishing location using a location device during hand hygiene compliance monitoring. For hand hygiene compliance monitoring, as with contact tracing, it may be necessary to know the location of the primary and secondary devices 100 102, whether the devices are in which room or which area. As with contact tracing, one way to achieve this is to use a location device to provide the location. The location device may be designed to transmit location signals containing a location identifier associated with the location device. These location signals may then be received by the primary and secondary devices 100 102, which may then decode the signals to derive the location identifier. The primary and secondary devices 100 102 must, however, first be designed to receive such location signals. In addition, in order to enable the location of the primary and secondary devices 100 102 to be monitored, it may be necessary for the devices each to send a monitoring signal encoded with the location identifier to a monitoring system.

Single-range chokepoint exciter as first location device. Therefore, as a first method of providing the location of devices in the second embodiment and as an aspect of the second embodiment, the system may further include the first location device 204, as illustrated in FIG. 5. The primary and secondary devices 100 102 may be configured to receive location signals from the first location device 204 and transmit monitoring signals in response to the received location signals in the same way as in the first embodiment. As an aspect of the second embodiment, the first location device 204 may be a single-range chokepoint exciter. This chokepoint exciter may be identical to the chokepoint exciter in the first embodiment.

Establishing location using a single-range bed slot exciter. It is possible to use a single-range bed slot exciter, instead of a single-range chokepoint exciter, to provide the location of the primary and secondary devices 100 102. This single-range bed slot exciter may be mounted on the wall next to the nearest end of a bed at a vertical level lower than that of the bed mattress. The single-range bed slot exciter may be powered by a DC supply or by PoE and may be connected to a LAN. The location of the single-range bed slot exciter may be programmed or configured through the LAN, if the exciter is connected to a LAN; if the exciter is not connected to a LAN, the exciter may be programmed or configured by software through a cable connected to a communication port on the exciter or by software through a configuration device interfaced wirelessly to the exciter. The location signals transmitted by the single-range bed slot exciter may be LF signals with the same frequency as that of the first and second wireless signals, or they may be IR or US signals. The single-range bed slot exciter may function in the same way as a single-range chokepoint exciter, except that they are designed to be mounted at different locations.

Figure 8:
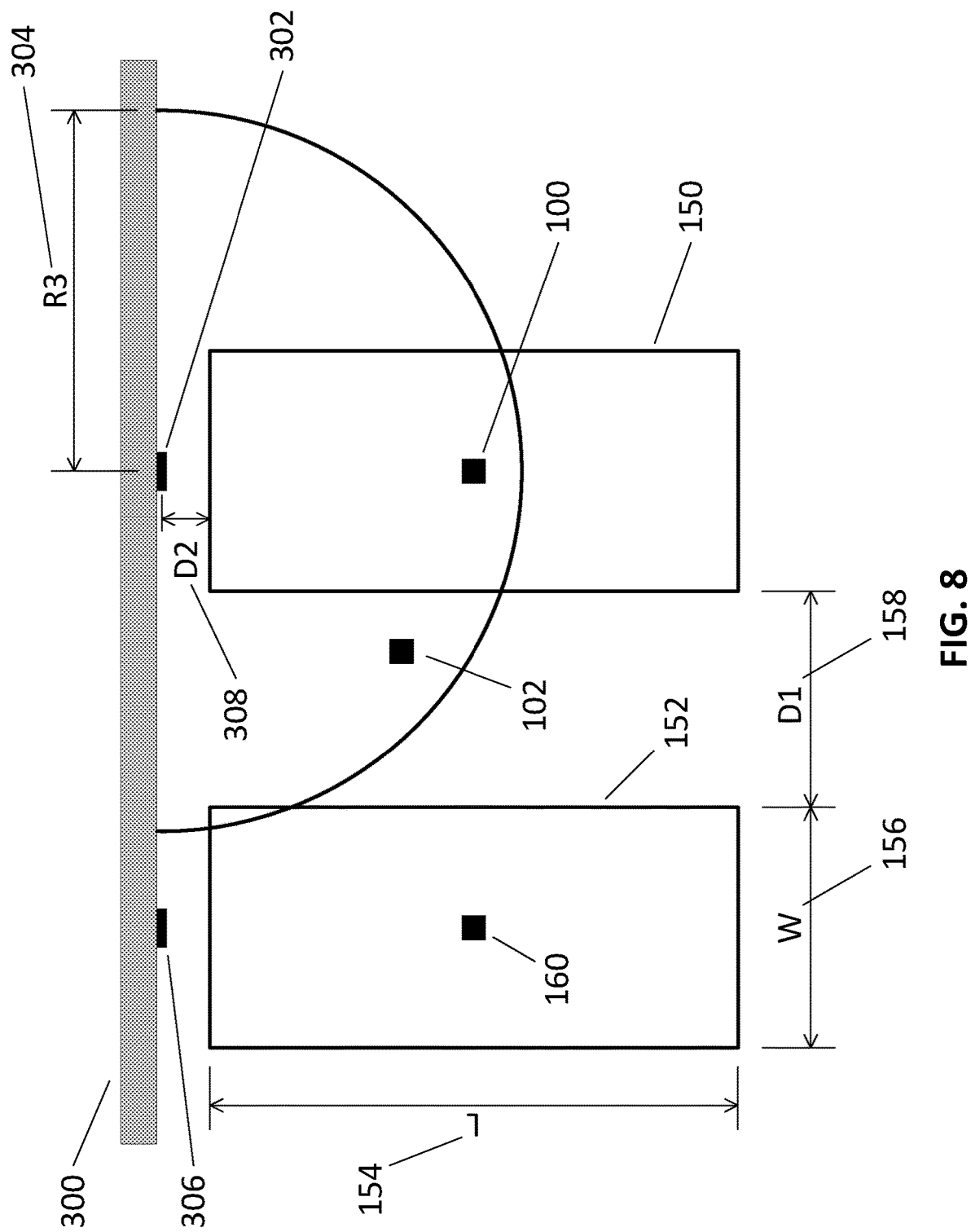
FIG. 8 illustrates a system including a primary device, a secondary device, and a second location device, in accordance with the second embodiment as applied to hand hygiene compliance monitoring.

Therefore, as a second method of providing the location of devices in the second embodiment and as an aspect of the second embodiment, the system may further include a second location device 302, as illustrated in FIG. 8. FIG. 8 includes a common wall 300, the first bed 150, the adjacent bed 152 positioned at the same distance from the wall as the first bed 150, an adjacent second location device 306 used with the adjacent bed 152, and an adjacent primary device 160 located at the center of the adjacent bed 152 or worn by a patient on the adjacent bed 152. The width of the space between the two beds is D1 158. The distance between the second location device 302 and the nearest edge of the first bed 150 is D2 308, which is also the distance between the adjacent second location device 306 and the nearest edge of the adjacent bed 152. The transmission range of the location signals transmitted by the second location device 302 is denoted by R3 304.

The primary and secondary devices 100 102 may be configured to work with the second location device 302 in the same way the primary and secondary devices 100 102 may be configured to work with the first location device 204, except that, as an aspect of the second embodiment, the second location device 302 may be configured to store a location identifier associated with the second location device 302, the primary device 100 may be further configured to encode the location identifier (associated with the second location device 302) into the multiple first wireless signals and the multiple second wireless signals, and the secondary device 102 may be further configured to derive the location identifier from at least one of the multiple wireless location signals received by the secondary device 102, from at least one of the multiple first wireless signals received by the secondary device 102, or from at least one of the multiple second wireless signals received by the secondary device 102. This means that the secondary device 102 may derive the location identifier not only from location signals transmitted by the second location device 302, but also from the first and second wireless signals transmitted by the primary device 100. The second location device 302 enables the primary and secondary devices 100 102 to establish their location.

Transmission range of single-range bed slot exciter. As an aspect of the second embodiment, the second location device 302 may be a single-range bed slot exciter. The transmission range R3 304 of the single-range bed slot exciter may be set in such a way that it is long enough for the location signals transmitted by the single-range bed slot exciter to reach a bed exciter under and at the center of the bed but not long enough for the signal to reach the bed exciter of an adjacent bed. It is important that the location signals cannot reach the bed exciter of an adjacent bed, or otherwise the location derived by the bed exciter will be incorrect. For example, if the distance D2 308 between the single-range bed slot exciter (second location device 302) and the nearest edge of the first bed 150 is 0.2 m and the bed length L 154 is 2.2 m, the distance between the single-range bed slot exciter (second location device 302) and the bed exciter (primary device 100) would be 0.2+1.1 m, or 1.3 m if the bed exciter (primary device 100) is positioned at the center of the first bed 150. The transmission range R3 304 may then be set to a little more than 1.3 m to, for example, 1.5 m. As a check, if the width D1 158 of the space between two adjacent beds is 0.9 m, the distance between the bed exciter (primary device 100) of the first bed 150 and the bed exciter (adjacent primary device 160) of the adjacent bed is 1.9 m, which consists of half the bed width W 156 (0.5 m), the width D1 158 of the space between two adjacent beds (0.9 m), and another half of the bed width W 156 (0.5 m). The distance between the single-range bed slot exciter (second location device 302) and the bed exciter (adjacent primary device 160) of the adjacent bed 152 will be $\sqrt{1.3^2+1.9^2}$ m, or 2.3 m. The transmission range R3 304 of 1.5 m is significantly less than 2.3 m, which means that the location signals from the single-range bed slot exciter (second location device 302) will not reach the bed exciter (adjacent primary device 160) of the adjacent bed 152. It may be noted that with the above arrangement, location signals from the single-range bed slot exciter (adjacent second location device 306) of the adjacent bed 152 will actually not reach the lengthwise centerline of first bed 150, so even if a bed exciter is installed not at the center of the first bed 150 but somewhere along the lengthwise centerline of the first bed 150, the bed exciter will still not be able to receive location signals from the single-range bed slot exciter (adjacent second location device 306) of the adjacent bed 152. In general, it may be necessary limit the transmission range R3 304 in such a way that the location signals do not interfere with the functions of other devices in the vicinity of the second location device 302, including those devices associated with an adjacent bed. The second location device 302 may be designed in such a way that the transmission range R3 304 is configurable.

Establishing location using a dual-range bed slot exciter. It is also possible to use a dual-range bed slot exciter, instead of a single-range chokepoint exciter or single-range bed slot exciter, to provide the location of the primary and secondary devices 100 102. This dual-range bed slot exciter may be mounted on the wall next to the nearest end of a bed at a vertical level lower than that of the bed mattress. The dual-range bed slot exciter may be powered by a DC supply or by PoE and may be connected to a LAN. The location of the dual-range bed slot exciter may be programmed or configured through the LAN, if the exciter is connected to a LAN; if the exciter is not connected to a LAN, the exciter may be programmed or configured by software through a cable connected to a communication port on the exciter or by software through a configuration device interfaced wirelessly to the exciter.

Figure 9:
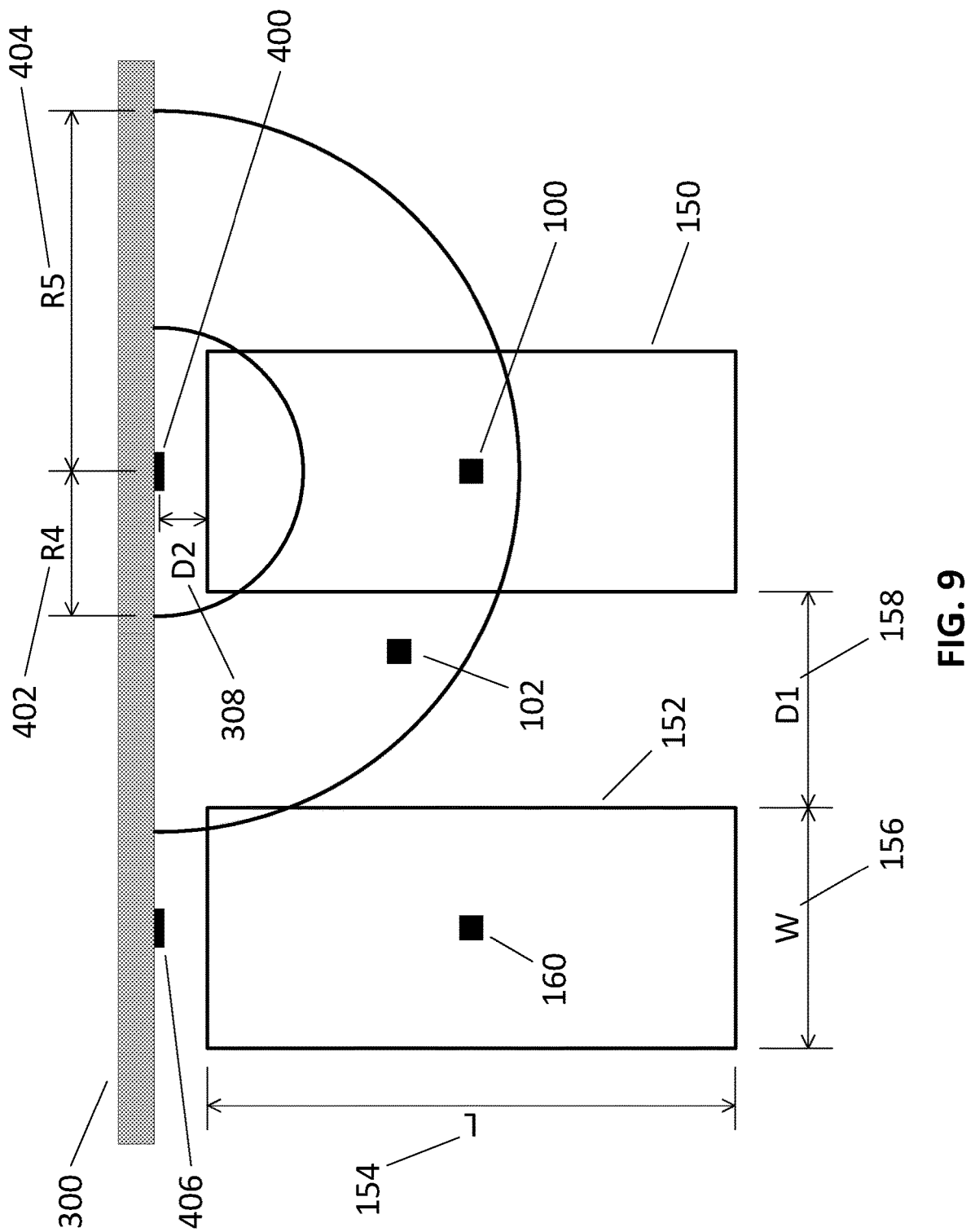
FIG. 9 illustrates a system including a primary device, a secondary device, and a third location device, in accordance with the second embodiment as applied to hand hygiene compliance monitoring.

Therefore, as a third method of providing the location of devices for the second embodiment and as an aspect of the second embodiment, the system may further include a third location device 400, as illustrated in FIG. 9. FIG. 9 includes the common wall 300, the first bed 150, the adjacent bed 152 positioned at the same distance from the wall as the first bed 150, an adjacent third location device 406 used with the adjacent bed 152, and the adjacent primary device 160 located at the center of the adjacent bed 152 or worn by a patient on the adjacent bed 152. The width of the space between the two beds is D1 158. The distance between the third location device 400 and the nearest edge of the first bed 150 is D2 308, which is also the distance between the adjacent third location device 406 and the nearest edge of the adjacent bed 152. The transmission ranges of the location signals transmitted by the third location device 400 are denoted by R4 402 and R5 404.

As an aspect of the second embodiment, this third location device 400 may be further configured to store a location identifier associated with the third location device 400 and transmit multiple near-range wireless location signals and multiple medium-range wireless location signals. Each near-range wireless location signal may have a near-range location signal transmission range R4 402 and may be encoded with the location identifier and a unique signal identifier of the multiple near-range wireless location signals. Each multiple medium-range wireless location signal may have a medium-range location signal transmission range R5 404 and may be encoded with the location identifier and a unique signal identifier of the multiple medium-range wireless location signals. The medium-range location signal transmission range R5 404 may be longer than the near-range location signal transmission range R4 402. The near-range and medium-range location signals may be LF signals with the same frequency as that of the first and second wireless signals, they may be IR or US signals, or they may be any combination of two of these three types of signals. The unique signal identifier of the near-range wireless location signals is different from the unique signal identifier of the medium-range wireless location signals; these unique signal identifiers enable a device that has received a (one) near-range wireless location signal or a (one) medium-range wireless location signal to identify the signal or, in other words, to know whether the signal it has received is a near-range wireless location signal or a medium-range wireless location signal. The third location device 400 may be similar to the primary device 100 in that both devices transmit signals with different transmission ranges, one transmission range longer than the other. The third location device 400 enables the primary and secondary devices 100 102 to establish their location.

As an aspect of the second embodiment, the secondary device 102 may be further configured to receive the multiple near-range wireless location signals when the secondary device 102 is within the near-range location signal transmission range R4 402 and receive the multiple medium-range wireless location signals when the secondary device 102 is within the medium-range location signal transmission range R5 404. If the secondary device 102 is a staff tag, the secondary device 102 may be further configured to derive the location identifier from at least one of the multiple near-range wireless location signals received by the secondary device 102 but not from any one of the multiple medium-range wireless location signals received by the secondary device 102, and transmit a wireless monitoring signal encoded with the unique device identifier of the secondary device 102 and the location identifier. Therefore, as an aspect of the second embodiment, the secondary device 102 may be a staff tag that is worn on a caregiver.

As an aspect of the second embodiment, the primary device 100 may be configured to receive the multiple near-range wireless location signals when the primary device 100 is within the near-range location signal transmission range and receive the multiple medium-range wireless location signals when the primary device 100 is within the medium-range location signal transmission range. If the primary device 100 is a patient tag, the primary device 100 may be further configured to derive the location identifier from at least one of the multiple near-range wireless location signals received by the primary device 100 but not from any one of the multiple medium-range wireless location signals received by the primary device 100, encode the location identifier into the multiple first wireless signals and the multiple second wireless signals, and transmit a wireless monitoring signal encoded with the unique device identifier of the primary device 100 and the location identifier. As an aspect of the second embodiment, considering that the secondary device 102 may also be configured to receive the first and second wireless signals, the secondary device 102 may then be further configured to derive the location identifier from at least one of the multiple near-range wireless location signals received by the secondary device 102, from at least one of the multiple first wireless signals received by the secondary device 102, or from at least one of the multiple second wireless signals received by the secondary device 102, but not from any one of the multiple medium-range wireless location signals received by the secondary device 102. This means that the secondary device 102 may derive the location identifier not only from the near-range wireless location signals transmitted by the third location device 400, but also from the first and second wireless signals transmitted by the primary device 100. As an aspect of the second embodiment, the primary device 100 may be a dual-range patient tag that is worn on a patient on a bed.

As an aspect of the second embodiment, if the primary device 100 is a bed exciter, the primary device 100 may be further configured to derive the location identifier from at least one of the multiple near-range wireless location signals received by the primary device 100 or from at least one of the multiple medium-range wireless location signals received by the primary device 100, encode the location identifier into the multiple first wireless signals and the multiple second wireless signals, and transmit a wireless monitoring signal encoded with the unique device identifier of the primary device 100 and the location identifier. As an aspect of the second embodiment, considering that the secondary device 102 may also be configured to receive the first and second wireless signals, the secondary device 102 may then be further configured to derive the location identifier from at least one of the multiple near-range wireless location signals received by the secondary device 102, from at least one of the multiple first wireless signals received by the secondary device 102, or from at least one of the multiple second wireless signals received by the secondary device 102, but not from any one of the multiple medium-range wireless location signals received by the secondary device 102. This means that the secondary device 102 may derive the location identifier not only from the near-range wireless location signals transmitted by the third location device 400, but also from the first and second wireless signals transmitted by the primary device 100. As an aspect of the second embodiment, the primary device 100 may be a dual-range bed exciter that is mounted under a bed.

Transmission ranges of dual-range bed slot exciter. As an aspect of the second embodiment, the third location device 400 may be a dual-range bed slot exciter. The near-range location signal transmission range R4 402 may be set in such a way that it covers a little more than half the bed width so that it can be received only by the patient tag of the patient on the bed and whose head is positioned towards the bed end closest to the bed slot exciter or by the staff tag of a caregiver standing next to the patient, but not by any other patient or staff tag in the vicinity of the bed. For example, if the distance D2 308 between the bed slot exciter (third location device 400) and the nearest edge of the first bed 150 is 0.2 m and the bed width W 156 is 1 m, the near-range location signal transmission range R4 402 may be set to 0.6 m, which will give a signal coverage area with a diameter of 1.2 m that covers part of the bed. The medium-range location signal transmission range R5 404 may be set in the same way as the transmission range R3 304; that is, the medium-range location signal transmission range R5 404 may be set to 1.5 m. In general, it may be necessary limit the medium-range location signal transmission range R5 404 in such a way that the medium-range location signals do not interfere with the functions of other devices in the vicinity of the third location device 400, including those devices associated with an adjacent bed. The third location device 400 may be designed in such a way that the near-range and medium-range location signal transmission ranges 402 404 are configurable.

A second embodiment incorporating the aspects described above in the paragraph titled "Establishing location using a dual-range bed slot exciter" through the paragraph titled "Transmission ranges of dual-range bed slot exciter" involving the use of a dual-range bed slot exciter (third location device 400) means that a dual-range patient tag (primary device 100) or a staff tag (secondary device 102) will derive the location identifier from the near-range location signals but not from the medium-range location signals, whereas a bed exciter will derive the location identifier from the near-range or medium-range location signals. This embodiment can help to prevent the situation in which a staff tag on a caregiver close to a bed or a patient tag on a patient on the bed receives a medium-range location signal from a dual-range bed slot exciter of an adjacent bed and derives the location identifier from this medium-range location signal, in which case, the derived location identifier will be incorrect. As discussed above in the paragraph titled "Transmission range of single-range bed slot exciter" and the paragraph titled "Transmission ranges of dual-range bed slot exciter", it is possible to set the medium-range location signal transmission range R5 404 of a dual-range bed slot exciter of a bed in such a way that medium-range location signals from the dual-range bed slot exciter will not reach a bed exciter that is installed at the center of an adjacent bed or along the lengthwise centerline of an adjacent bed. This means that a bed exciter may be designed to derive the location identifier from the near-range or medium-range location signals of the dual-range bed slot exciter of the bed where the bed exciter is installed. Therefore, a second embodiment incorporating the aspects described above in the paragraph titled "Establishing location using a dual-range bed slot exciter" through the paragraph titled "Transmission ranges of dual-range bed slot exciter" can help to ensure that a staff tag, a patient tag, or a bed exciter associated with a bed will correctly establish its location. Asset tags for assets that are placed near a dual-range bed slot exciter may, for accurate location tracking of assets, be designed also to derive the location identifier from the near-range location signals but not from the medium-range location signals.

In all of the above three methods of providing the location of devices in the second embodiment, each of the monitoring signals effectively reports, to the monitoring system, the location of the device (primary device 100 or secondary device 102) that transmits the monitoring signal, enabling the monitoring system to know the location of the device. These monitoring signals may be transmitted immediately or shortly after the device has received a location signal from the location device 204. These monitoring signals may be received wirelessly by signal receivers installed in the vicinity of the transmitting device (primary device 100 or secondary device 102), then sent to a server of the hospital computer system via a local area network (LAN), and then analyzed by software on the server.

Transmission intervals for third location device. As an aspect of the second embodiment, the third location device 400 may be further configured to transmit the multiple near-range wireless location signals at preset near-range location signal transmission intervals and the multiple medium-range wireless location signals at preset medium-range location signal transmission intervals. In other words, the interval or period between consecutive near-range wireless location signals may be of a fixed or constant duration, and the interval or period between consecutive medium-range wireless location signals may also be of a fixed or constant duration. A preset near-range or medium range location signal transmission interval may, for example, be any value ranging from two to 10 seconds. The preset near-range location signal transmission intervals may be set to be the same as or different from the preset medium-range location signal transmission intervals. The third location device 400 may be designed in such a way that these preset transmission intervals are configurable. When transmitting signals for the first time after a period of no signal transmission, the third location device 400 may be configured to transmit an initial near-range location signal and an initial medium-range location signal one after another in any order, with or without any significant time difference. For example, the third location device 400 may be configured to transmit an initial near-range location signal first, and after a time difference of five seconds, transmit an initial medium-range location signal, and from then on, transmit the signals in accordance with the preset transmission intervals. The third location device 400 may be designed in such a way that this time difference is configurable. The third location device 400 may be programmed or configured by software through a configuration device interfaced wirelessly to the third location device 400.

Third embodiment: location tracking using a dual-range exciter. The primary and secondary devices 100 102 in the first embodiment may, with additional features, also be used in hospitals and other patient care facilities for more precise location tracking of personnel and assets. This location tracking application may be described in a third embodiment and by reference to FIG. 1. In such an application, and as an aspect of the third embodiment, the primary device 100 may be a dual-range exciter that is mounted at the center of the ceiling of a room or area or on a wall, and the secondary device 102 may be a staff tag that is worn on a caregiver, a patient tag that is worn on a patient, or an asset tag that is attached to an asset.

Therefore, in the third embodiment, as illustrated in FIG. 1, the invention is a system for location tracking or proximity detection. The system includes the same primary device 100 and the same secondary device 102 as in the first embodiment. The primary device 100 may be further configured to store a location identifier associated with the primary device 100 and encode the location identifier into each of the multiple first wireless signals and each of the multiple second wireless signals. The secondary device 102 may be further configured to record a first number representing the number of first wireless signals received by the secondary device 102 during a preset tracking period and record a second number representing the number of second wireless signals received by the secondary device 102 during the preset tracking period. The preset tracking period may, for example, range 20 seconds to 2 minutes. The secondary device 102 may be designed in such a way that the preset tracking period is configurable.

As an aspect of the third embodiment, the secondary device 102 may be further configured to derive the location identifier from at least one of the multiple first wireless signals received by the secondary device 102 or from at least one of the multiple second wireless signals received by the secondary device 102, and transmit a wireless monitoring signal encoded with the unique device identifier of the secondary device 102, the location identifier, the first number, and the second number. This monitoring signal may be received wirelessly by signal receivers installed in the vicinity of the secondary device 102, then sent to a server of the hospital computer system via a local area network (LAN), and then analyzed by software on the server. This monitoring signal may be transmitted in accordance with a preset schedule or in accordance with one or more preset criteria. A preset schedule may, for example, be every 15 minutes, and a preset criterion may, for example, be that the monitoring signal is transmitted only if there is a change in the location of the primary device 100, as can happen if the secondary device 102 is at first in one area where it is within range of a primary device 100 and later moves to another area where it is within range of another primary device. The secondary device 102 may be designed in such a way that the preset schedule and preset criteria are configurable.

The first number and the second number are intended to be used by the server software to determine whether the secondary device 102 was in the first transmission region, which is the region within the first transmission range R1 104; or in the second transmission region, which is the region between the first and second transmission ranges 104 106; as explained above in the paragraph titled "Analysis of multiple signals", it is generally necessary to analyze multiple signals received by the secondary device 102 over a period in order to determine whether the secondary device 102 is in the first or second transmission region, and it is generally not reliable to carry out this determination on the basis of just one signal received at a particular point in time. Therefore, and as an aspect of the third embodiment, the system may further include a server configured to determine or estimate, from the first number and the second number, whether the secondary device 102 has been within the first transmission range R1 104 or between the first transmission range R1 104 and the second transmission range R2 106. For example, consider the situation in which the first and second wireless signals are transmitted alternately at the same preset transmission intervals, as is the case described above in the paragraph titled "Estimation of contact times: start of description" through the paragraph titled "Estimation of contact times: end of description". If the number of first wireless signals is equal or approximately equal to the number of second wireless signals, the secondary device 102 may be determined to be within the first transmission range R1 104. If only second wireless signals are received, the secondary device 102 may be determined to be between the first and second transmission ranges 104 106. However, if both first and second wireless signals are received and the number of first wireless signals differs greatly from the number of second wireless signals, it is possible that the secondary device 102 may not have been in the same transmission region throughout the whole preset tracking period, but rather, have been in one region at certain times and in the other region at other times during the preset tracking period. In this case, it may be appropriate to determine or estimate the last known location of the secondary device 102 during the preset tracking period, and to be able do this, more information may be needed, such as the time at which the signals are received.

In particular, it may be useful to know, for the first and second wireless signals treated separately, when the signal was last received by the secondary device 102. Therefore, and as an aspect of the third embodiment, the secondary device 102 may be further configured to record a first contact end time indicating the time at which the secondary device 102 last receives a (one) first wireless signal from the primary device during the preset tracking period, record a second contact end time indicating the time at which the secondary device 102 last receives a (one) second wireless signal from the primary device during the preset tracking period, and encode the first contact end time and the second contact end time into the wireless monitoring signal. These times may then be analyzed by the server software. Therefore, and as an aspect of the third embodiment, the system may further include a server configured to determine or estimate—from the first contact end time and the second contact end time, or from the first number, the second number, the first contact end time, and the second contact end time—whether the secondary device 102 has been within the first transmission range R1 104 or between the first transmission range R1 104 and the second transmission range R2 106. For example, if the second contact end time is significantly later than the first contact end time, the last known location of the secondary device 102 may be determined to be between the first and second transmission ranges 104 106. If the second contact end time is approximately the same as the first contact end time, the last known location of the secondary device 102 may be determined to be within the first transmission range R1 104. More sophisticated methods may be used that take into consideration both the numbers of signals received and the times the signals are first and last received, to give better accuracy in determining or estimating the location of the secondary device 102.

As an aspect of the third embodiment, the secondary device 102 may be further configured to record a first contact start time indicating the time at which the secondary device 102 first receives a (one) first wireless signal from the primary device during the preset tracking period, record a second contact start time indicating the time at which the secondary device 102 first receives a (one) second wireless signal from the primary device during the preset tracking period, and encode the first contact start time and the second contact start time into the wireless monitoring signal. These times may then be analyzed by the server software. As an aspect of the third embodiment, the system may further include a server configured to determine or estimate—from the first number, the second number, the first contact start time, the first contact end time, the second contact start time, and the second contact end time—(a) a first signal-reception period representing the period within which first wireless signals have been received by the secondary device 102 during the preset tracking period, (b) a second signal-reception period representing the period within which second wireless signals have been received by the secondary device 102 during the preset tracking period, (c) a first missed-signal number representing the number of first wireless signals that have been missed by the secondary device 102 during the preset tracking period, and (d) a second missed-signal number representing the number of second wireless signals that have been missed by the secondary device 102 during the preset tracking period. The first and second missed-signal numbers may be determined or estimated by comparing the first and second signal-reception periods against the first number and the second number; this information may be used to monitor and assess the reliability of the system.

From the above description of the third embodiment, it can be seen that, for the same signal coverage, the use of a dual-range exciter enables the location of the secondary device 102 to be determined more precisely than if a single-range exciter is used. For a large room or area, multiple dual-range exciters may be used to ensure that the combined signal coverage of the exciters is large enough to encompass the whole room or area. For the same level of precision in location tracking, the use of a dual-range exciter can help to reduce not only the number of exciters needed to obtain the same signal coverage, but also the amount of accompanying hardware, such as cabling.

Figure 10:
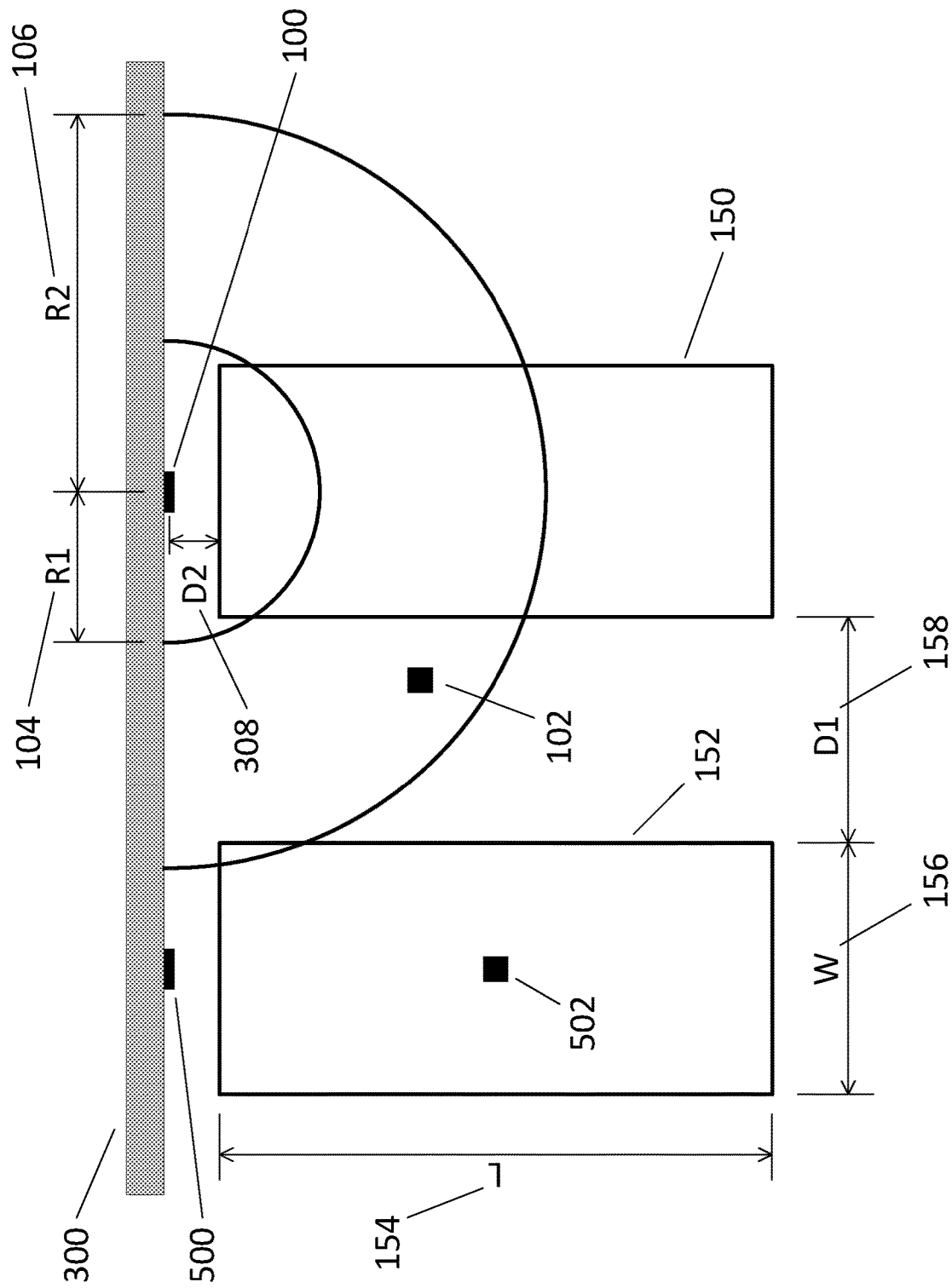
FIG. 10 illustrates a system including a primary device and a secondary device, in accordance with a fourth embodiment.

Fourth embodiment: establishing location using a dual-range bed slot exciter. In a fourth embodiment, as illustrated in FIG. 10, the invention is a system for location tracking or proximity detection. The system includes the same primary device 100 and the same secondary device 102 as in the first embodiment. The primary device 100 may be further configured to store a location identifier associated with the primary device 100 and encode the location identifier into each of the multiple first wireless signals and each of the multiple second wireless signals. FIG. 10 includes the common wall 300, the first bed 150, the adjacent bed 152 positioned at the same distance from the wall as the first bed 150, an adjacent primary device 500 used with the adjacent bed 152, an adjacent secondary device 502 located at the center of the adjacent bed 152, worn by a patient on the adjacent bed 152, or worn by a caregiver standing next to the adjacent bed 152. The width of the space between the two beds is D1 158. The distance between the primary device 100 and the nearest edge of the first bed 150 is D2 308, which is also the distance between the adjacent primary device 500 and the nearest edge of the adjacent bed 152.

Dual-range bed slot exciter as primary device. As an aspect of the fourth embodiment, the primary device 100 may be a dual-range bed slot exciter, which may be mounted on the wall next to the nearest end of a bed at a vertical level lower than that of the bed mattress. The dual-range bed slot exciter may be powered by a DC supply or by PoE and may be connected to a LAN. The location of the dual-range bed slot exciter may be programmed or configured through the LAN, if the exciter is connected to a LAN; if it is not connected to a LAN, it may be programmed or configured by other means provided or recommended by the manufacturer of the exciter. The first and second transmission ranges 104 106 may be set in the same way as those of the third location device 400 described in the second embodiment. In general, it may be necessary to limit the second transmission range R2 106 in such a way that the second wireless signals do not interfere with the functions of other devices in the vicinity of the primary device 100, including those devices associated with an adjacent bed. The primary device 100 may be designed in such a way that the first and second transmission ranges 104 106 are configurable, depending on factors such as the size of the bed, the width of the space between adjacent beds, the distance between a bed and the wall on which the primary device 100 is mounted, and the expected position of the secondary device 102 with respect to the position of the primary device 100. The primary device 100 in the fourth embodiment may be identical to the third location device 400 in the second embodiment.

Patient tag, staff tag, or asset tag as secondary device. As an aspect of the fourth embodiment, if the secondary device 102 is a patient tag, a staff tag, or an asset tag, the secondary device 102 may be further configured to derive the location identifier from at least one of the multiple first wireless signals received by the secondary device 102 but not from any one of the multiple second wireless signals received by the secondary device 102, and transmit one or more signals each encoded with the unique device identifier of the secondary device 102 and the location identifier. Therefore, as an aspect of the fourth embodiment, the secondary device 102 may be a staff tag, a patient tag, or an asset tag. The primary device 100 enables the secondary device 102 to establish its location.

Bed exciter as secondary device. As an aspect of the fourth embodiment, if the secondary device 102 is a bed exciter, the secondary device 102 may be further configured to derive the location identifier from at least one of the multiple first wireless signals received by the secondary device 102 or from at least one of the multiple second wireless signals received by the secondary device 102, and transmit one or more signals each encoded with the unique device identifier of the secondary device 102 and the location identifier. Therefore, as an aspect of the fourth embodiment, the secondary device 102 may be a bed exciter. The primary device 100 enables the secondary device 102 to establish its location.

A fourth embodiment incorporating the aspects described above in the paragraph titled "Patient tag, staff tag or asset tag as secondary device" and the paragraph titled "Bed exciter as secondary device" involving the use of a dual-range bed slot exciter as the primary device 100 means that a patient tag, a staff tag, or an asset tag will derive the location identifier from the first wireless signals in the first transmission range R1 104 but not from the second wireless signals in the second, and longer, transmission range R2 106, whereas a bed exciter will derive the location identifier from the first or second wireless signals. This embodiment can help to prevent the situation in which a staff tag on a caregiver close to a bed, a patient tag on a patient on the bed, or an asset tag of an asset placed near the dual-range bed slot exciter of the bed receives a second wireless signal from a dual-range bed slot exciter of an adjacent bed and derives the location identifier from this second wireless signal, in which case, the derived location identifier will be incorrect. As a bed exciter is typically installed somewhere near the middle of a bed, and as discussed above in the paragraph titled "Transmission range of single-range bed slot exciter" and the paragraph titled "Transmission ranges of dual-range bed slot exciter", it is possible to set the longer transmission range of a dual-range bed slot exciter in such a way that signals with the longer transmission range will not a reach a bed exciter that is installed at the center of an adjacent bed or along the lengthwise centerline of an adjacent bed. This means that a bed exciter may be designed to derive the location identifier from the first or second wireless signals of the dual-range bed slot exciter of the bed where the bed exciter is installed. Therefore, this embodiment can help to ensure that a staff tag, a patient tag, an asset tag, or a bed exciter associated with a bed will correctly establish its location.

In the aspects described above in the paragraph titled "Patient tag, staff tag or asset tag as secondary device" and the paragraph titled "Bed exciter as secondary device", the one or more signals transmitted by the secondary device 102 will depend on the functions of the secondary device 102. If the secondary device 102 is a bed exciter or patient tag, the secondary device 102 may be configured to transmit LF, IR, or US signals to be received by another tag and UHF or Wi-Fi signals to be received by the hospital computer system through signal receivers installed in the vicinity of the device. If the secondary device 102 is a staff tag, the secondary device 102 may be configured to transmit UHF or Wi-Fi signals to be received by the hospital computer system. The UHF or Wi-Fi signals enable the hospital computer system to know the location of the bed exciter, patient tag, or staff tag, whichever is applicable, and this information is useful for applications that require location tracking.

The system in the fourth embodiment may be used in hospitals and other patient care facilities to establish the location of a hospital bed that has a bed exciter, the location of a patient on the bed who is wearing a patient tag, the location of a caregiver near the bed who is wearing a staff tag, and the location of an asset near a dual-range bed slot exciter and attached with an asset tag. In general, the system can be used in applications that can take advantage of a dual-range primary device 100 to provide a location identifier by having certain secondary devices configured to derive the location identifier from only the shorter-range signals transmitted by the dual-range primary device 100 and by having other secondary devices configured to derive the location identifier from the shorter-range signals or the longer-range signals transmitted by the dual-range primary device 100.

Monitoring signals. In the first, second, third, and fourth embodiments, the monitoring signals may be an ultra-high frequency (UHF) signals with a radio frequency of 868.4 MHz, 919.8 MHz, or 925 MHz, or they may be Wi-Fi signals with a radio frequency in the 2.4-GHz or 5-GHz band. Other frequencies may be used in place of these, depending on the radio frequency regulations of the jurisdiction in which the system is used.

Figure 11:
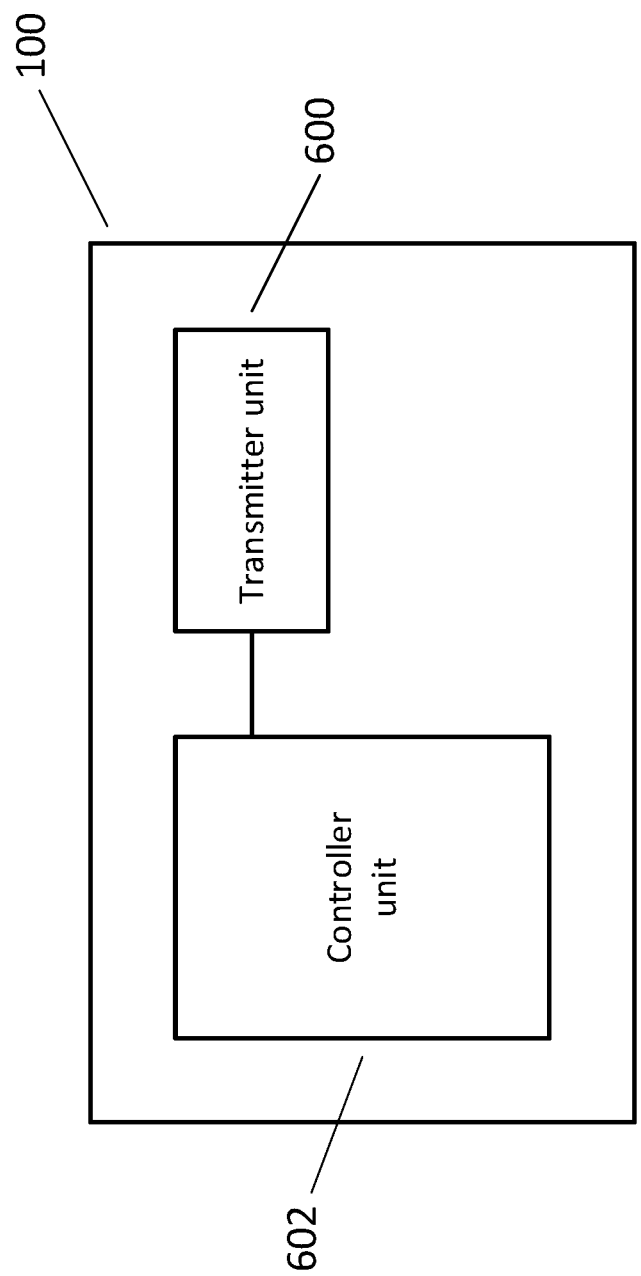
FIG. 11 illustrates a primary device for communication with a secondary device, in accordance with a fifth embodiment.

Fifth embodiment: primary device for communication with a secondary device. In a fifth embodiment, as illustrated in FIG. 11, the invention is the primary device 100 for communication with the secondary device 102. The primary device 100 includes a transmitter unit 600 and a controller unit 602. The transmitter unit 600 is configured to transmit multiple first wireless signals to be received by the secondary device 102, each first wireless signal having a first transmission range and encoded with a unique signal identifier of the multiple first wireless signals. The transmitter unit 600 is also configured to transmit multiple second wireless signals to be received by the secondary device 102, each second wireless signal having a second transmission range and encoded with a unique signal identifier of the multiple second wireless signals. The second transmission range is longer than the first transmission range. The controller unit 602 is coupled to the transmitter unit and configured to control the transmitter unit such that the transmitter unit is configured to transmit the multiple first wireless signals and the multiple second wireless signals. The first wireless signals may be considered to be near-range signals, and the second wireless signals may be considered to be medium-range signals. The unique signal identifier of the first wireless signals is different from the unique signal identifier of the second wireless signals; these unique signal identifiers enable a device that has received a (one) first wireless signal or a (one) second wireless signal to identify the signal or, in other words, to know whether the signal it has received is a first wireless signal or a second wireless signal. The control provided by the controller unit 602 may include determining the contents of the first and second wireless signals to be transmitted by the transmitter unit 600. The controller unit 602 may be a microcontroller.

As an aspect of the fifth embodiment, the primary device 100 may further include a receiver unit coupled to the controller unit. The receiver unit may be configured to receive multiple incoming wireless signals from other devices and the controller unit 602 may be further configured to control the receiver unit such that the receiver unit is configured to receive the multiple incoming wireless signals from other devices. The control provided by the controller unit 602 may include processing the signals, such as decoding the signals, received by the receiver unit and determining how to respond to the received signals. As an aspect of the fifth embodiment, the controller unit 602 may be further configured to store a unique device identifier of the primary device 100. This unique device identifier may be stored in the built-in memory of the controller unit 602. As an aspect of the fifth embodiment, the controller unit 602 may be further configured to encode the unique device identifier of the primary device 100 into each of the multiple first wireless signals and each of the multiple second wireless signals. The unique device identifier in the signals enables devices that receive the signals to identify the primary device 100, and such identification is necessary for location tracking and proximity detection. As an aspect of the fifth embodiment, the primary device 100 may be a dual-range patient tag or a dual-range bed exciter.

As an aspect of the fifth embodiment, the transmitter unit 600 may be further configured to transmit a wireless monitoring signal encoded with the unique device identifier of the primary device 100 and the controller unit 602 may be further configured to control the transmitter unit such that the transmitter unit is further configured to transmit the wireless monitoring signal. This monitoring signal may be further encoded with additional information about the primary device 100 itself, such as information on the battery level of the primary device 100, or additional information acquired from signals received by the primary device 100, information such as a location identifier. This monitoring signal may be received by a hospital computer system and used by the computer system to monitor the primary device 100.

As an aspect of the fifth embodiment, the controller unit 602 may be further configured to store a location identifier associated with the primary device 100. This location identifier may be stored also in the built-in memory of the controller unit 602. As an aspect of the fifth embodiment, the controller unit 602 may be further configured to encode the location identifier into each of the multiple first wireless signals and each of the multiple second wireless signals. The location identifier in the signals enable devices that receive the signals to establish their location. As an aspect of the fifth embodiment, the primary device 100 may be a dual-range bed slot exciter.

As an aspect of the fifth embodiment, the transmitter unit 600 may include one or more transmitters. As an aspect of the fifth embodiment, the receiver unit may include one or more receivers. As an aspect of the fifth embodiment, the transmitter unit 600 may be further configured to transmit the multiple first wireless signals at first preset transmission intervals and the multiple second wireless signals at second preset transmission intervals. The first preset transmission intervals may be set to be the same as or different from the second preset transmission intervals; these intervals may be configured as described earlier in the paragraph "Transmission intervals for primary device". As an aspect of the fifth embodiment, the multiple first wireless signals and the multiple second wireless signals may each be a low-frequency signal, an infrared signal, or an ultrasound signal. As an aspect of the fifth embodiment, the receiver unit may be further configured to receive LF, IR, or US signals, or any combination of these three types of signals. As an aspect of the fifth embodiment, the wireless monitoring signal may be a UHF signal or a Wi-Fi signal.

The primary device 100 in the fifth embodiment may function in the same way as the primary device 100 in the first, second, third, and fourth embodiments, and in the same way as the third location device 400 in the second embodiment.

Figure 12:
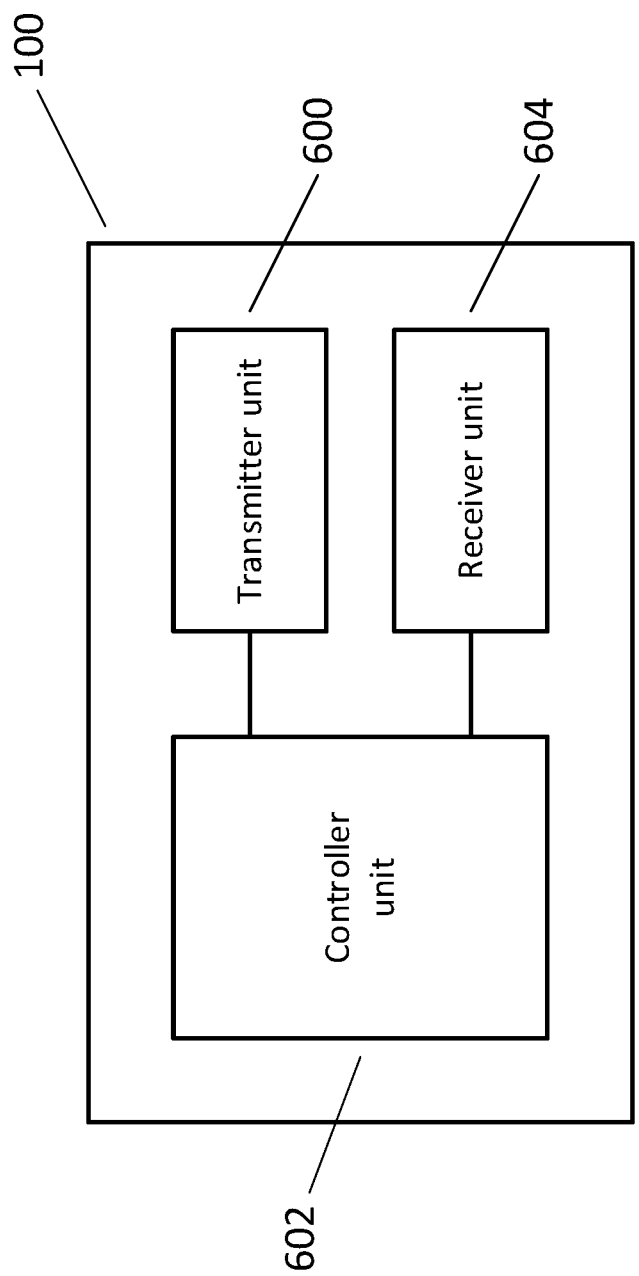
FIG. 12 illustrates a primary device for communication with a secondary device, in accordance with a sixth embodiment.

Sixth embodiment: primary device for communication with a secondary device. In a sixth embodiment, as illustrated in FIG. 12, the invention is the primary device 100 for communication with the secondary device 102. The primary device 100 includes the transmitter unit 600, the controller unit 602, and a receiver unit 604 coupled to the controller unit 602. The receiver unit 604 is configured to receive multiple incoming wireless signals from other devices and the controller unit 602 is further configured to control the receiver unit 604 such that the receiver unit 604 is configured to receive the multiple incoming wireless signals from other devices. The receiver unit 604 may be identical to the receiver unit in the fifth embodiment.

Figure 13:
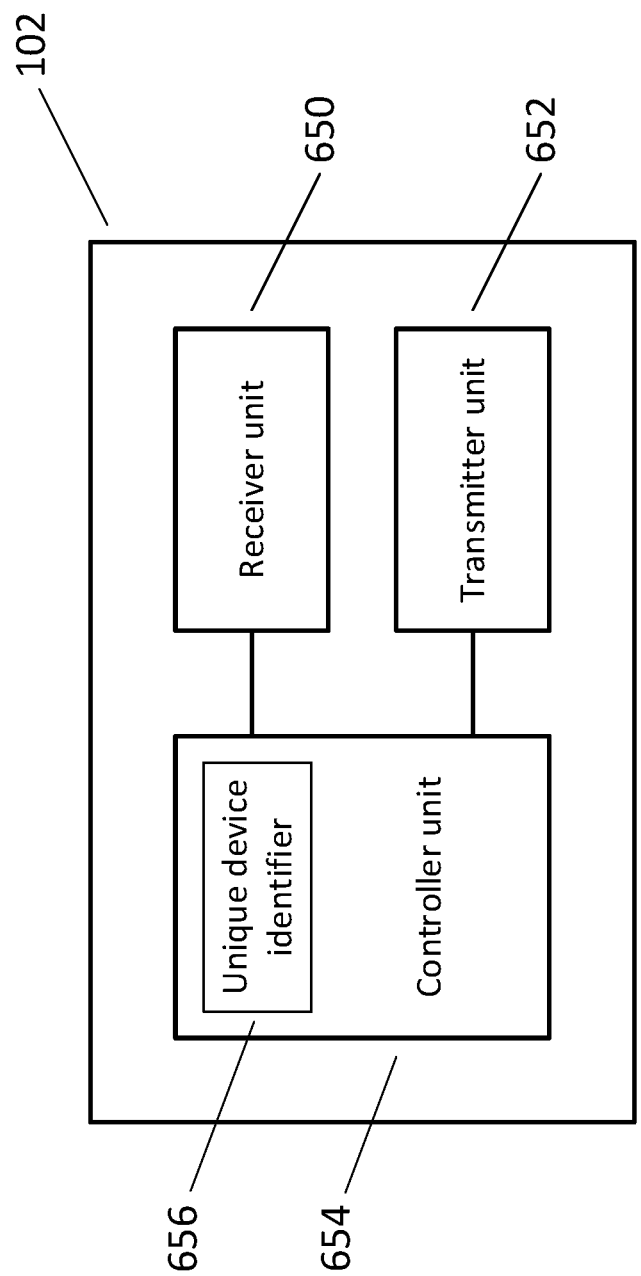
FIG. 13 illustrates a secondary device for communication with a primary device, in accordance with a seventh embodiment.

Seventh embodiment: secondary device for communication with a primary device. In a seventh embodiment, as illustrated in FIG. 13, the invention is the secondary device 102 for communication with the primary device 100. The secondary device 102 is configured to store a unique device identifier 656 of the secondary device 102. The secondary device 102 is further configured to receive, from the primary device 100, multiple first wireless signals, each first wireless signal having a first transmission range and encoded with a unique signal identifier of the multiple first wireless signals, when the secondary device 102 is within the first transmission range. The secondary device 102 is additionally configured to receive, from the primary device 100, multiple second wireless signals, each second wireless signal having a second transmission range and encoded with a unique signal identifier of the multiple second wireless signals, when the secondary device 102 is within the second transmission range. The second transmission range is longer than the first transmission range.

The secondary device 102 may include a receiver unit 650 configured to receive at least the multiple first wireless signals and multiple second wireless signals, a transmitter unit 652 configured to transmit multiple outgoing wireless signals, and a controller unit 654 coupled to the receiver unit 650 and the transmitter unit 652. The controller unit 654 may be configured to control the receiver unit 650 such that the receiver unit 650 is configured to receive at least the multiple first wireless signals and multiple second wireless signals; this feature means that the receiver unit 650 may be further configured to receive other wireless signals besides the first and second wireless signals, and the controller unit 654 may be further configured to control the receiver unit 650 such that the receiver unit 650 is further configured to receive these other wireless signals. The controller unit 654 may be further configured to control the transmitter unit 652 such that the transmitter unit 652 is configured to transmit the multiple outgoing wireless signals. The controller unit 654 may be further configured to store the unique device identifier 656 of the secondary device 102. The control provided by the controller unit 654 may include processing the signals, such as decoding the signals, received by the receiver unit 650; determining how to respond to the received signals; and determining the contents of signals to be transmitted by the transmitter unit 652. The unique device identifier 656 of the secondary device 102 may be stored in the built-in memory of the controller unit 654. The controller unit 654 may be a microcontroller.

Ways of providing two transmission ranges. For the primary device 100 in the first, second, third, fourth, and fifth embodiments and the third location device 400 in the second embodiment, the two transmission ranges can technically be accomplished in at least two ways. The first way is to use a single transmitter and control the transmission ranges by controlling the power supplied to the transmitter. The second way is to use two transmitters, one for each transmission range. If the signals are of different types (for example, one LF and one IR), different types of transmitters may be used, and the transmission ranges may also be controlled by controlling the power supplied to each transmitter.

Use of more than two transmission ranges. It may be seen from the above embodiments that a primary device with two transmission ranges may enable greater precision in location tracking and proximity detection compared to a primary device with only one transmission range. In special situations where even greater precision is required, the primary device 100 may be further configured to transmit one or more additional signals similar to the first and second wireless signals, but with transmission ranges different from each other and from those of the first and second wireless signals. Each of these additional signals may then be encoded with the unique device identifier of the primary device 100 and a unique signal identifier of the additional signal. The secondary device 102 may then be further configured to receive these additional signals. Depending on the application, the secondary device 102 and any other devices that work with the primary device 100 may be further configured in such a way as to meet the objective of the application. Technically, the number of transmission ranges that a device may have will depend not only on the objective of the application but also on the design of the device. In general, for the same type of signal, multiple transmission ranges can be achieved in at least three ways: (a) by using single transmitters each providing a different transmission range, (b) by using a single transmitter and controlling the transmission ranges by controlling the power supplied to the transmitter, and (c) by using a combination of single-range and multiple-range transmitters. If the signals are of different types (for example, one LF and one IR), different types of transmitters may need to be used.

Use of multiple data packets. It is recognized that the amount of data that can be encoded into a wireless signal is determined by, among other things, the design of the transmitter, the frequency of the carrier signal, the length of each data packet (in bits or bytes, for example), and the signal modulation method used to encode the data. It is also recognized that in cases in which it is not possible to fit all the required data in one single data packet, the required data may be transmitted in a series of data packets and then decoded by the receiver or by the server software. For example, if the data to be encoded into a signal cannot fit in one single data packet, the signal may be transmitted via a series of data packets.

Types of short-range signals. At this point, it may be appropriate to compare the three types of signals: LF, IR, and US. These signals are short-range signals commonly used for location tracking and proximity detection of people and objects. In general, LF signals can pass through walls, but some of the energy will be absorbed by the wall, such that the signal that emerges at the other side of the wall will generally be weaker. The higher the density and the larger the thickness of the wall, the greater will be the absorption. For example, a concrete wall will absorb more energy than a plaster wall. LF signals can travel around corners and obstacles by diffraction, although the diffracted signals may be weaker, but being radio waves, LF signals are susceptible to electromagnetic interference (EMI), also called radio-frequency interference (RFI), which may come from nearby electrical devices. LF signals may, therefore, be generally considered to be omnidirectional.

IR signals, being light waves, cannot pass through solid opaque objects, such as walls, metal, and people. The most commonly used type of IR signals is the directional type, rather than the diffused type. The directional type requires unobstructed line of sight between the IR transmitter and the IR receiver. This means that an opaque object in the path of an IR signal can block the signal and prevent it from being received by the IR receiver, although reflected IR signals may sometimes be strong enough for IR receivers to receive them. In applications that require IR signals to have larger signal coverage angle and range than can be provided by a single IR transmitter, multiple IR transmitters each providing a defined signal coverage region may be used to provide the necessary signal coverage. US signals may be directional or omnidirectional, depending on the design of the US transmitter. IR and US signals, being non-radio waves, are not affected by electromagnetic interference. US signals, being mechanical signals, can, like LF signals, travel around corners and obstacles by diffraction. IR and US signals may be used for more accurate location tracking within an enclosed area because they cannot pass through walls and, hence, will not interfere with other devices in adjoining rooms. In general, for any one type of signal, multiple transmitters may be used to provide greater signal coverage that can be provided by a single transmitter. Some typical transmission ranges used in indoor applications are follows: LF, 2.5 m; IR, 10 m; US, 80 m.

Use of two or more types of signals. In some applications, it may be more practical to use multiple types of signals to achieve better overall signal coverage or more accurate proximity detection or location tracking. For example, if a dual-range bed slot exciter (third location device 400) is used to provide location information, it may be desirable to use one that transmits two LF signals and one IR or US signal: a near-range LF signal, a medium-range LF signal, and a medium-range IR or US signal. The medium-range IR signal represents an additional source of location information for the bed exciter and will be useful in cases where electromagnetic interference (EMI) from the bed exciter motor, which is usually installed under the bed, causes the bed exciter, which is usually also installed under the bed, to fail to receive the medium-range LF signal, assuming that the bed slot exciter is installed at a height that enables the medium-range IR or US signal to reach the bed exciter with minimal signal blockage.

As another example, if a chokepoint exciter that transmits location information using LF signals is installed near a first doorway of a room or area, the LF signals, which can pass through walls, may reach an adjacent doorway if the adjacent doorway is located close to the first doorway. The LF signals may also reach the hallway just outside the first or adjacent doorway. All this can lead a tag at the adjacent doorway or in the hallway receiving an LF signal from the chokepoint exciter, causing the location of the tag to be wrongly established. One way to resolve this problem is to place an IR or US transmitter within the room or area as an additional source of location information. Since IR and US signals cannot pass through walls, they may be used to provide the correct location in case the tag receives an LF signal from an adjacent doorway. In this way, having two types of signals can help to increase the likelihood that a tag's location is correctly established.

Figure 14:
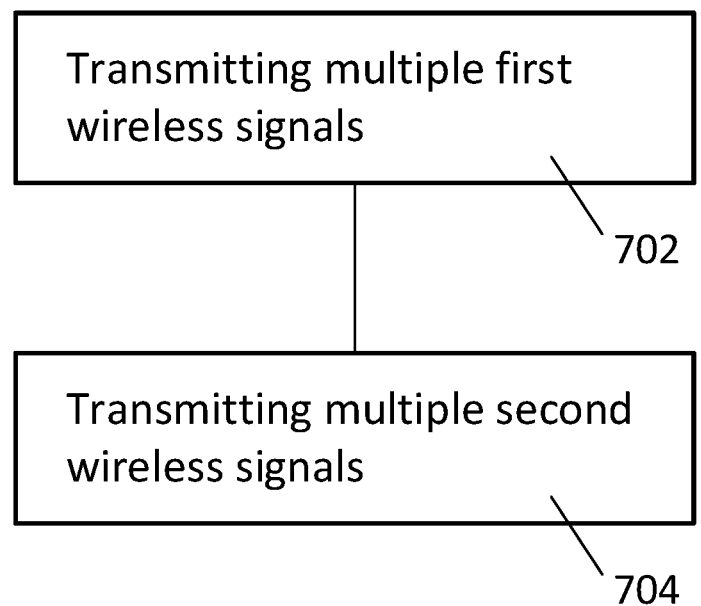
FIG. 14 is a schematic illustrating a method of using a primary device for location tracking or proximity detection, in accordance with an eighth embodiment.

Eighth embodiment: method of using a primary device. FIG. 14 is a schematic illustrating a method of using a primary device for location tracking or proximity detection, in accordance with an eighth embodiment. The method includes, in 702, transmitting, using a transmitter unit of the primary device, multiple first wireless signals to be received by a secondary device, each first wireless signal having a first transmission range and encoded with a unique signal identifier of the multiple first wireless signals. The method also includes, in 704, transmitting, using the transmitter unit of the primary device, multiple second wireless signals to be received by the secondary device, each second wireless signal having a second transmission range and encoded with a unique signal identifier of the multiple second wireless signals. The second transmission range is longer than the first transmission range.

Figure 15:
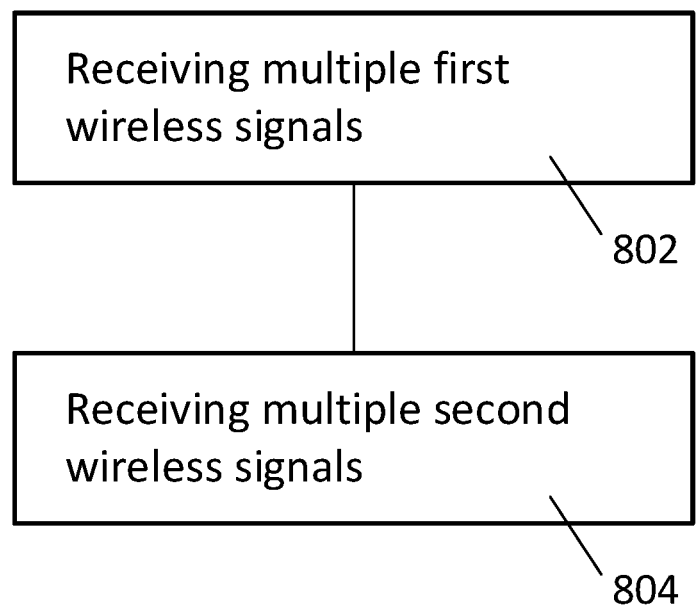
FIG. 15 is a schematic illustrating a method of using a secondary device for location tracking or proximity detection, in accordance with a ninth embodiment.

Ninth embodiment: method of using a secondary device. FIG. 15 is a schematic illustrating a method of using a secondary device for location tracking or proximity detection, in accordance with a ninth embodiment. The method includes, in 802, receiving, using a receiver unit of the secondary device, multiple first wireless signals from a primary device, each first wireless signal having a first transmission range and encoded with a unique signal identifier of the multiple first wireless signals, when the secondary device is within the first transmission range. The method also includes, in 804, receiving, using the receiver unit of the secondary device, multiple second wireless signals from the primary device, each second wireless signal having a second transmission range and encoded with a unique signal identifier of the multiple second wireless signals, when the secondary device is within the second transmission range. The second transmission range is longer than the first transmission range.

Figure 16:
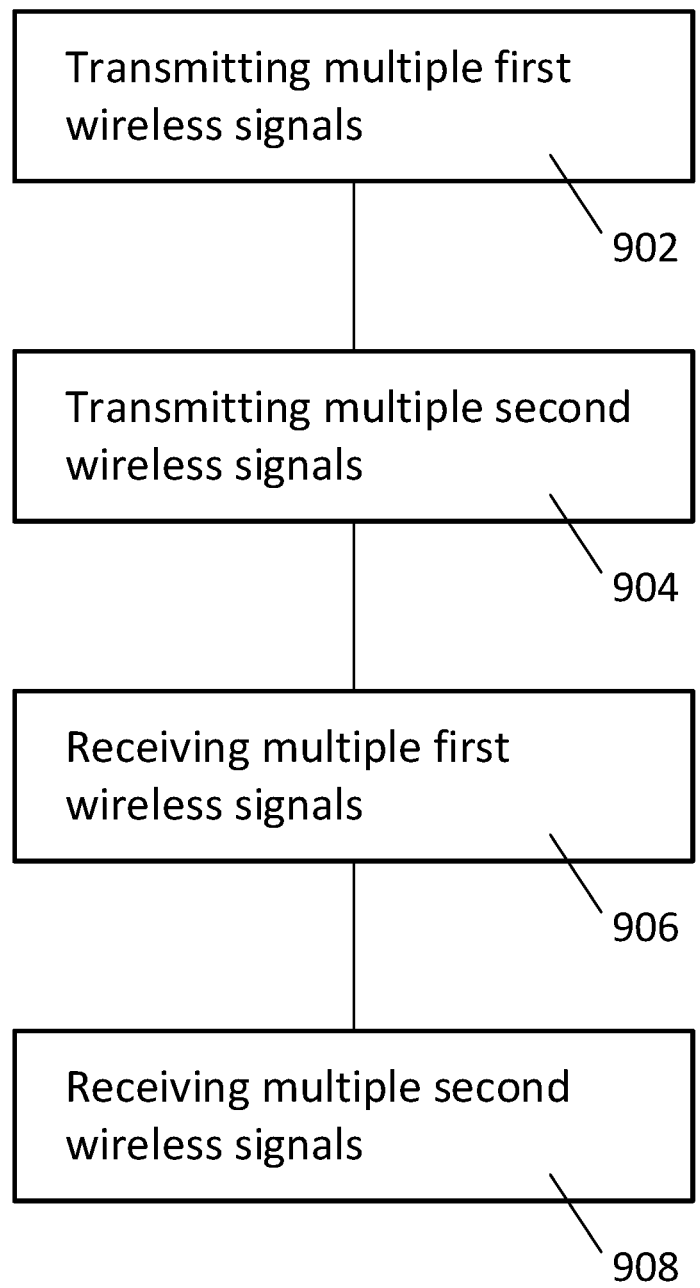
FIG. 16 is a schematic illustrating a method for location tracking or proximity detection, in accordance with a tenth embodiment.

Tenth embodiment: method for location tracking or proximity detection. FIG. 16 is a schematic illustrating a method for location tracking or proximity detection, in accordance with a tenth embodiment. The method includes, in 902, transmitting, by a primary device, multiple first wireless signals, each first wireless signal having a first transmission range and encoded with a unique signal identifier of the multiple first wireless signals. The method also includes, in 904, transmitting, by the primary device, multiple second wireless signals, each second wireless signal having a second transmission range and encoded with a unique signal identifier of the multiple second wireless signals. The method further includes, in 906, receiving, by a secondary device, the multiple first wireless signals when the secondary device is within the first transmission range. The method additionally includes, in 908, receiving, by the secondary device, the multiple second wireless signals when the secondary device is within the second transmission range. The second transmission range is longer than the first transmission range.

In one embodiment of the present invention, a primary device for communication with a secondary device is provided. The primary device includes a transmitter unit configured to transmit multiple first wireless signals to be received by the secondary device and multiple second wireless signals to be received by the secondary device. Each first wireless signal has a first transmission range and is encoded with a unique signal identifier of the multiple first wireless signals, and each second wireless signal has a second transmission range and is encoded with a unique signal identifier of the multiple second wireless signals. The second transmission range is longer than the first transmission range. The primary device also includes a controller unit coupled to the transmitter unit, the controller unit configured to control the transmitter unit such that the transmitter unit is configured to transmit the multiple first wireless signals and the multiple second wireless signals.

The primary device may also include a receiver unit coupled to the controller unit, the receiver unit configured to receive multiple incoming wireless signals from other devices and the controller unit further configured to control the receiver unit such that the receiver unit is configured to receive the multiple incoming wireless signals from the other devices.

The controller unit may be further configured to store a unique device identifier of the primary device. The primary device may be a dual-range patient tag or a dual-range bed exciter.

The controller unit may be further configured to encode the unique device identifier of the primary device into each of the multiple first wireless signals and each of the multiple second wireless signals.

The transmitter unit may be further configured to transmit a wireless monitoring signal encoded with the unique device identifier of the primary device and the controller unit may be further configured to control the transmitter unit such that the transmitter unit is further configured to transmit the wireless monitoring signal.

The controller unit may be further configured to store a location identifier associated with the primary device. The primary device may be a dual-range bed slot exciter.

The controller unit may be further configured to encode the location identifier into each of the multiple first wireless signals and each of the multiple second wireless signals.

The transmitter unit may include one or more transmitters. The receiver unit may include one or more receivers.

The transmitter unit may be further configured to transmit the multiple first wireless signals at first preset transmission intervals and the multiple second wireless signals at second preset transmission intervals.

The multiple first wireless signals and the multiple second wireless signals may each be a low-frequency signal, an infrared signal, or an ultrasound signal.

The receiver unit may be configured to receive low-frequency signals, infrared signals, or ultrasound signals, or any combination of low-frequency signals, infrared signals, and ultrasound signals.

The wireless monitoring signal may be an ultra-high frequency signal or a Wi-Fi signal.

In one embodiment of the present invention, a secondary device for communication with a primary device is provided. The secondary device is configured to store a unique device identifier of the secondary device. The secondary device is further configured to receive, from the primary device, multiple first wireless signals, each first wireless signal having a first transmission range and encoded with a unique signal identifier of the multiple first wireless signals, when the secondary device is within the first transmission range. The secondary device is additionally configured to receive, from the primary device, multiple second wireless signals, each second wireless signal having a second transmission range and encoded with a unique signal identifier of the multiple second wireless signals, when the secondary device is within the second transmission range. The second transmission range is longer than the first transmission range.

Each first wireless signal may be further encoded with a unique device identifier of the primary device, and each second wireless signal may be further encoded with the unique device identifier of the primary device. The secondary device may be further configured to identify a contact episode start time of a contact episode as the time at which the secondary device first receives a first wireless signal or a second wireless signal, whichever is received first, from the primary device, the contact episode start time indicating that the secondary device has come within the first transmission range (if a first wireless signal is received first) or the second transmission range (if a second wireless signal is received first). The secondary device may be additionally configured to identify a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range. The secondary device may be a staff tag or a patient tag.

The secondary device may be further configured to transmit a wireless monitoring signal encoded with the unique device identifier of the primary device and the unique device identifier of the secondary device at the contact episode end time.

The secondary device may be further configured to record a first number representing the number of first wireless signals received by the secondary device during the contact episode, record a second number representing the number of second wireless signals received by the secondary device during the contact episode, and encode the first number and the second number into the wireless monitoring signal.

The secondary device may be further configured to record a signal-reception start time identical to the contact episode start time; record a signal-reception end time indicating the time at which the secondary device last receives a first wireless signal or a second wireless signal, whichever is received last, from the primary device during the contact episode; and encode the signal-reception start time and the signal-reception end time into the wireless monitoring signal.

Alternatively, the secondary device may be further configured to record a first contact start time indicating the time at which the secondary device first receives a first wireless signal from the primary device during the contact episode; record a first contact end time indicating the time at which the secondary device last receives a first wireless signal from the primary device during the contact episode; record a second contact start time indicating the time at which the secondary device first receives a second wireless signal from the primary device during the contact episode; record a second contact end time indicating the time at which the secondary device last receives a second wireless signal from the primary device during the contact episode; and encode the first contact start time, the first contact end time, the second contact start time, and the second contact end time into the wireless monitoring signal.

Each first wireless signal may be further encoded with a unique device identifier of the primary device, and each second wireless signal may be further encoded with the unique device identifier of the primary device. The secondary device may be further configured to identify a contact episode start time of a contact episode as the time at which the secondary device first receives a first wireless signal from the primary device, the contact episode start time indicating that the secondary device has come within the first transmission range. The secondary device may be a staff tag.

The secondary device may be further configured to generate one or more alert signals at the end of a second preset period immediately following a first preset period that starts from the contact episode start time, after the secondary device has determined that the time difference between the time at which the secondary device last receives a first wireless signal from the primary device during the first preset period and the contact episode start time is greater than or equal to a preset length of time.

Alternatively, the secondary device may be further configured to generate one or more alert signals at the end of a second preset period immediately following a first preset period that starts from the contact episode start time, after the secondary device has received at least a preset number of first wireless signals from the primary device during the first preset period.

The secondary device may be further configured to identify a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range.

The secondary device may be further configured to generate one or more alert signals at the end of a third preset period immediately following the preset out-of-range period.

The secondary device may be further configured to transmit a wireless monitoring signal encoded with the unique device identifier of the primary device and the unique device identifier of the secondary device at the contact episode end time.

The secondary device may be further configured to record a contact start time identical to the contact episode start time; record a contact end time indicating the time at which the secondary device last receives a first wireless signal or a second wireless signal, whichever is received last, from the primary device during the contact episode; and encode the contact start time and the contact end time into the wireless monitoring signal.

Each first wireless signal may be further encoded with a location identifier associated with the primary device, and each second wireless signal may be further encoded with the location identifier. The secondary device may be further configured to record a first number representing the number of first wireless signals received by the secondary device during a preset tracking period and record a second number representing the number of second wireless signals received by the secondary device during the preset tracking period. The secondary device may be a staff tag, a patient tag, or an asset tag.

The secondary device may be further configured to derive the location identifier from at least one of the multiple first wireless signals received by the secondary device or from at least one of the multiple second wireless signals received by the secondary device, and transmit a wireless monitoring signal encoded with the unique device identifier of the secondary device, the location identifier, the first number, and the second number.

The secondary device may be further configured to record a first contact end time indicating the time at which the secondary device last receives a first wireless signal from the primary device during the preset tracking period, record a second contact end time indicating the time at which the secondary device last receives a second wireless signal from the primary device during the preset tracking period, and encode the first contact end time and the second contact end time into the wireless monitoring signal.

The secondary device may be further configured to record a first contact start time indicating the time at which the secondary device first receives a first wireless signal from the primary device during the preset tracking period, record a second contact start time indicating the time at which the secondary device first receives a second wireless signal from the primary device during the preset tracking period, and encode the first contact start time and the second contact start time into the wireless monitoring signal.

Each first wireless signal may be further encoded with a location identifier associated with the primary device, and each second wireless signal may be further encoded with the location identifier. The secondary device may be further configured to derive the location identifier from at least one of the multiple first wireless signals received by the secondary device but not from any one of the multiple second wireless signals received by the secondary device, and transmit one or more signals each encoded with the unique device identifier of the secondary device and the location identifier. The secondary device may be a staff tag, a patient tag, or an asset tag.

Alternatively, the secondary device may be further configured to derive the location identifier from at least one of the multiple first wireless signals received by the secondary device or from at least one of the multiple second wireless signals received by the secondary device, and transmit one or more signals each encoded with the unique device identifier of the secondary device and the location identifier. The secondary device may be a bed exciter.

The secondary device may include a receiver unit configured to receive at least the multiple first wireless signals and multiple second wireless signals, a transmitter unit configured to transmit multiple outgoing wireless signals, and a controller unit coupled to the receiver unit and the transmitter unit. The controller unit may be configured to control the receiver unit such that the receiver unit is configured to receive at least the multiple first wireless signals and multiple second wireless signals. The controller unit may be further configured to control the transmitter unit such that the transmitter unit is configured to transmit the multiple outgoing wireless signals. The controller unit may be additionally configured to store the unique device identifier of the secondary device.

In one embodiment of the present invention, a system for location tracking or proximity detection is provided. The system includes a primary device configured to transmit multiple first wireless signals and multiple second wireless signals. Each first wireless signal has a first transmission range and is encoded with a unique signal identifier of the multiple first wireless signals. Each second wireless signal has a second transmission range and is encoded with a unique signal identifier of the multiple second wireless signals. The second transmission range is longer than the first transmission range. The system also includes a secondary device configured to store a unique device identifier of the secondary device, receive the multiple first wireless signals when the secondary device is within the first transmission range, and receive the multiple second wireless signals when the secondary device is within the second transmission range.

The primary device may be further configured to store a unique device identifier of the primary device and encode the unique device identifier of the primary device into each of the multiple first wireless signals and each of the multiple second wireless signals.

The secondary device may be further configured to identify a contact episode start time of a contact episode as the time at which the secondary device first receives a first wireless signal or a second wireless signal, whichever is received first, from the primary device, the contact episode start time indicating that the secondary device has come within the first transmission range (if a first wireless signal is received first) or the second transmission range (if a second wireless signal is received first). The secondary device may be additionally configured to identify a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range.

The primary device may be a dual-range patient tag or a dual-range bed exciter, and the secondary device may be a staff tag or a patient tag.

The secondary device may be further configured to transmit a wireless monitoring signal encoded with the unique device identifier of the primary device and the unique device identifier of the secondary device at the contact episode end time.

The secondary device may be further configured to record a first number representing the number of first wireless signals received by the secondary device during the contact episode, record a second number representing the number of second wireless signals received by the secondary device during the contact episode, and encode the first number and the second number into the wireless monitoring signal.

The secondary device may be further configured to record a signal-reception start time identical to the contact episode start time; record a signal-reception end time indicating the time at which the secondary device last receives a first wireless signal or a second wireless signal, whichever is received last, from the primary device during the contact episode; and encode the signal-reception start time and the signal-reception end time into the wireless monitoring signal.

Alternatively, the secondary device may be further configured to record a first contact start time indicating the time at which the secondary device first receives a first wireless signal from the primary device during the contact episode; record a first contact end time indicating the time at which the secondary device last receives a first wireless signal from the primary device during the contact episode; record a second contact start time indicating the time at which the secondary device first receives a second wireless signal from the primary device during the contact episode; record a second contact end time indicating the time at which the secondary device last receives a second wireless signal from the primary device during the contact episode; and encode the first contact start time, the first contact end time, the second contact start time, and the second contact end time into the wireless monitoring signal.

The system may further include a server configured to determine or estimate, from the first number and the second number, a first total contact time representing the total length of time during which the secondary device has been within the first transmission range, and a second total contact time representing the total length of time during which the secondary device has been between the first transmission range and the second transmission range.

Alternatively, the system may further include a server configured to determine or estimate—from the first number, the second number, the signal-reception start time, and the signal-reception end time—a total signal-reception period representing the period within which signals have been received by the secondary device during the contact episode, and a total missed-signal number representing the total number of signals that have been missed by the secondary device during the contact episode.

Alternatively, the system may further include a server configured to determine or estimate—from the first number, the second number, the first contact start time, the first contact end time, the second contact start time, and the second contact end time—a first signal-reception period representing the period within which first wireless signals have been received by the secondary device during the contact episode, a second signal-reception period representing the period within which second wireless signals have been received by the secondary device during the contact episode, a first missed-signal number representing the number of first wireless signals that have been missed by the secondary device during the contact episode, and a second missed-signal number representing the number of second wireless signals that have been missed by the secondary device during the contact episode.

The system may further include a location device configured to store a location identifier associated with the location device and transmit multiple wireless location signals, each wireless location signal having a location signal transmission range and encoded with the location identifier. The primary device may be further configured to receive the multiple wireless location signals when the primary device is within the location signal transmission range, derive the location identifier from at least one of the multiple wireless location signals received by the primary device, and transmit a wireless monitoring signal encoded with the unique device identifier of the primary device and the location identifier. The secondary device may be further configured to receive the multiple wireless location signals when the secondary device is within the location signal transmission range, derive the location identifier from at least one of the multiple wireless location signals received by the secondary device, and transmit a wireless monitoring signal encoded with the unique device identifier of the secondary device and the location identifier. The location device may be a single-range chokepoint exciter.

The primary device may be further configured to transmit the multiple first wireless signals at first preset transmission intervals and the multiple second wireless signals at second preset transmission intervals.

The location device may be further configured to transmit the multiple wireless location signals at preset transmission intervals.

The secondary device may be further configured to identify a contact episode start time of a contact episode as the time at which the secondary device first receives a first wireless signal from the primary device, the contact episode start time indicating that the secondary device has come within the first transmission range. The primary device may be a dual-range patient tag or a dual-range bed exciter, and the secondary device may be a staff tag.

The secondary device may be further configured to generate one or more alert signals at the end of a second preset period immediately following a first preset period that starts from the contact episode start time, after the secondary device has determined that the time difference between the time at which the secondary device last receives a first wireless signal from the primary device during the first preset period and the contact episode start time is greater than or equal to a preset length of time.

Alternatively, the secondary device may be further configured to generate one or more alert signals at the end of a second preset period immediately following a first preset period that starts from the contact episode start time, after the secondary device has received at least a preset number of first wireless signals from the primary device during the first preset period.

The secondary device may be further configured to identify a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range.

The secondary device may be further configured to generate one or more alert signals at the end of a third preset period immediately following the preset out-of-range period.

The secondary device may be further configured to transmit a wireless monitoring signal encoded with the unique device identifier of the primary device and the unique device identifier of the secondary device at the contact episode end time.

The secondary device may be further configured to record a contact start time identical to the contact episode start time; record a contact end time indicating the time at which the secondary device last receives a first wireless signal or a second wireless signal, whichever is received last, from the primary device during the contact episode; and encode the contact start time and the contact end time into the wireless monitoring signal.

The system may further include a server configured to determine or estimate, from the contact start time and the contact end time, a total signal-reception period representing the period within which signals have been received by the secondary device during the contact episode.

The primary device may be further configured to encode the location identifier into the multiple first wireless signals and the multiple second wireless signals. The secondary device may be further configured to derive the location identifier from at least one of the multiple wireless location signals received by the secondary device, from at least one of the multiple first wireless signals received by the secondary device, or from at least one of the multiple second wireless signals received by the secondary device. The location device may be a single-range bed slot exciter.

The system may further include a location device configured to store a location identifier associated with the location device. The location device may be configured to transmit multiple near-range wireless location signals and multiple medium-range wireless location signals. Each near-range wireless location signal may have a near-range location signal transmission range and may be encoded with the location identifier and a unique signal identifier of the multiple near-range wireless location signals. Each medium-range wireless location signal may have a medium-range location signal transmission range and may be encoded with the location identifier and a unique signal identifier of the multiple medium-range wireless location signals. The medium-range location signal transmission range may be longer than the near-range location signal transmission range. The secondary device may be further configured to receive the multiple near-range wireless location signals when the secondary device is within the near-range location signal transmission range, and receive the multiple medium-range wireless location signals when the secondary device is within the medium-range location signal transmission range. The secondary device may be additionally configured to derive the location identifier from at least one of the multiple near-range wireless location signals received by the secondary device but not from any one of the multiple medium-range wireless location signals received by the secondary device, and transmit a wireless monitoring signal encoded with the unique device identifier of the secondary device and the location identifier. The location device may be a dual-range bed slot exciter and the secondary device may be a staff tag.

The primary device may be further configured to receive the multiple near-range wireless location signals when the primary device is within the near-range location signal transmission range, and receive the multiple medium-range wireless location signals when the primary device is within the medium-range location signal transmission range. The primary device may be additionally configured to derive the location identifier from at least one of the multiple near-range wireless location signals received by the primary device but not from any one of the multiple medium-range wireless location signals received by the primary device, encode the location identifier into the multiple first wireless signals and the multiple second wireless signals, and transmit a wireless monitoring signal encoded with the unique device identifier of the primary device and the location identifier. The secondary device may be further configured to derive the location identifier from at least one of the multiple near-range wireless location signals received by the secondary device, from at least one of the multiple first wireless signals received by the secondary device, or from at least one of the multiple second wireless signals received by the secondary device, but not from any one of the multiple medium-range wireless location signals received by the secondary device. The primary device may be a dual-range patient tag.

Alternatively, the primary device may be further configured to receive the multiple near-range wireless location signals when the primary device is within the near-range location signal transmission range, and receive the multiple medium-range wireless location signals when the primary device is within the medium-range location signal transmission range. The primary device may be additionally configured to derive the location identifier from at least one of the multiple near-range wireless location signals received by the primary device or from at least one of the multiple medium-range wireless location signals received by the primary device, encode the location identifier into the multiple first wireless signals and the multiple second wireless signals, and transmit a wireless monitoring signal encoded with the unique device identifier of the primary device and the location identifier. The secondary device may be further configured to derive the location identifier from at least one of the multiple near-range wireless location signals received by the secondary device, from at least one of the multiple first wireless signals received by the secondary device, or from at least one of the multiple second wireless signals received by the secondary device, but not from any one of the multiple medium-range wireless location signals received by the secondary device. The primary device may be a dual-range bed exciter.

The location device may be further configured to transmit the multiple near-range wireless location signals at preset near-range location signal transmission intervals and the multiple medium-range wireless location signals at preset medium-range location signal transmission intervals.

The primary device may be further configured to store a location identifier associated with the primary device and encode the location identifier into each of the multiple first wireless signals and each of the multiple second wireless signals.

The secondary device may be further configured to record a first number representing the number of first wireless signals received by the secondary device during a preset tracking period and record a second number representing the number of second wireless signals received by the secondary device during the preset tracking period. The primary device may be a dual-range exciter, and the secondary device may be a staff tag, a patient tag, or an asset tag.

The secondary device may be further configured to derive the location identifier from at least one of the multiple first wireless signals received by the secondary device or from at least one of the multiple second wireless signals received by the secondary device, and transmit a wireless monitoring signal encoded with the unique device identifier of the secondary device, the location identifier, the first number, and the second number.

The secondary device may be further configured to record a first contact end time indicating the time at which the secondary device last receives a first wireless signal from the primary device during the preset tracking period, record a second contact end time indicating the time at which the secondary device last receives a second wireless signal from the primary device during the preset tracking period, and encode the first contact end time and the second contact end time into the wireless monitoring signal.

The secondary device may be further configured to record a first contact start time indicating the time at which the secondary device first receives a first wireless signal from the primary device during the preset tracking period, record a second contact start time indicating the time at which the secondary device first receives a second wireless signal from the primary device during the preset tracking period, and encode the first contact start time and the second contact start time into the wireless monitoring signal.

The system may further include a server configured to determine or estimate, from the first number and the second number, whether the secondary device has been within the first transmission range or between the first transmission range and the second transmission range.

The system may further include a server configured to determine or estimate—from the first contact end time and the second contact end time, or from the first number, the second number, the first contact end time, and the second contact end time—whether the secondary device has been within the first transmission range or between the first transmission range and the second transmission range.

The system may further include a server configured to determine or estimate—from the first number, the second number, the first contact start time, the first contact end time, the second contact start time, and the second contact end time—a first signal-reception period representing the period within which first wireless signals have been received by the secondary device during the preset tracking period, a second signal-reception period representing the period within which second wireless signals have been received by the secondary device during the preset tracking period, a first missed-signal number representing the number of first wireless signals that have been missed by the secondary device during the preset tracking period, and a second missed-signal number representing the number of second wireless signals that have been missed by the secondary device during the preset tracking period.

The secondary device may be further configured to derive the location identifier from at least one of the multiple first wireless signals received by the secondary device but not from any one of the multiple second wireless signals received by the secondary device, and transmit one or more signals each encoded with the unique device identifier of the secondary device and the location identifier. The primary device may be a dual-range bed slot exciter, and the secondary device may be a staff tag, a patient tag, or an asset tag.

Alternatively, the secondary device may be further configured to derive the location identifier from at least one of the multiple first wireless signals received by the secondary device or from at least one of the multiple second wireless signals received by the secondary device, and transmit one or more signals each encoded with the unique device identifier of the secondary device and the location identifier. The primary device may be a dual-range bed slot exciter and the secondary device may be a bed exciter.

The primary device may include a transmitter unit configured to transmit at least the multiple first wireless signals and multiple second wireless signals. The primary device may also include a controller unit coupled to the transmitter unit, the controller unit configured to control the transmitter unit such that the transmitter unit is configured to transmit at least the multiple first wireless signals and multiple second wireless signals.

The primary device may further include a receiver unit coupled to the controller unit of the primary device, the receiver unit configured to receive multiple incoming wireless signals from other devices and the controller unit further configured to control the receiver unit such that the receiver unit is configured to receive the multiple incoming wireless signals.

The secondary device may include a receiver unit configured to receive at least the multiple first wireless signals and multiple second wireless signals, a transmitter unit configured to transmit multiple outgoing wireless signals, and a controller unit coupled to the receiver unit and the transmitter unit. The controller unit may be configured to control the receiver unit such that the receiver unit is configured to receive at least the multiple first wireless signals and multiple second wireless signals. The controller unit may be further configured to control the transmitter unit such that the transmitter unit is configured to transmit the multiple outgoing wireless signals. The controller unit may be additionally configured to store the unique device identifier of the secondary device.

In one embodiment of the present invention, a method of using a primary device for location tracking or proximity detection is provided. The method includes transmitting, using a transmitter unit of the primary device, multiple first wireless signals to be received by a secondary device, each first wireless signal having a first transmission range and encoded with a unique signal identifier of the multiple first wireless signals. The method also includes transmitting, using the transmitter unit of the primary device, multiple second wireless signals to be received by the secondary device, each second wireless signal having a second transmission range and encoded with a unique signal identifier of the multiple second wireless signals. The second transmission range is longer than the first transmission range.

Each first wireless signal may be further encoded with a unique device identifier of the primary device, and each second wireless signal may be further encoded with the unique device identifier of the primary device. The unique device identifier of the primary device and a unique device identifier of the secondary device may be encoded into a wireless monitoring signal to be subsequently transmitted by the secondary device.

Each first wireless signal may be further encoded with a location identifier, and each second wireless signal may be further encoded with the location identifier. A unique device identifier of the secondary device and the location identifier may be encoded into a wireless monitoring signal to be subsequently transmitted by the secondary device.

The method may also include receiving, using a receiver unit of the primary device, multiple wireless location signals from a location device, each wireless location signal having a location signal transmission range and encoded with a location identifier associated with the location device, when the primary device is within the location signal transmission range. The method may further include transmitting, using the transmitter unit of the primary device, a wireless monitoring signal encoded with a unique device identifier of the primary device and the location identifier.

In one embodiment of the present invention, a method of using a secondary device for location tracking or proximity detection is provided. The method includes receiving, using a receiver unit of the secondary device, multiple first wireless signals from a primary device, each first wireless signal having a first transmission range and encoded with a unique signal identifier of the multiple first wireless signals, when the secondary device is within the first transmission range. The method also includes receiving, using the receiver unit of the secondary device, multiple second wireless signals from the primary device, each second wireless signal having a second transmission range and encoded with a unique signal identifier of the multiple second wireless signals, when the secondary device is within the second transmission range. The second transmission range is longer than the first transmission range.

Each first wireless signal may be further encoded with a unique device identifier of the primary device, and each second wireless signal may be further encoded with the unique device identifier of the primary device. The method may also include transmitting, using a transmitter unit of the secondary device, a wireless monitoring signal encoded with the unique device identifier of the primary device and a unique device identifier of the secondary device.

Each first wireless signal may be further encoded with a location identifier, and each second wireless signal may be further encoded with the location identifier. The method may also include transmitting, using a transmitter unit of the secondary device, a wireless monitoring signal encoded with a unique device identifier of the secondary device and the location identifier.

The method may also include receiving, using the receiver unit of the secondary device, multiple wireless location signals from a location device, each wireless location signal having a location signal transmission range and encoded with a location identifier associated with the location device, when the secondary device is within the location signal transmission range. The method may further include transmitting, using a transmitter unit of the secondary device, a wireless monitoring signal encoded with a unique device identifier of the secondary device and the location identifier.

In one embodiment of the present invention, a method for location tracking or proximity detection is provided. The method includes transmitting, by a primary device, multiple first wireless signals, each first wireless signal having a first transmission range and encoded with a unique signal identifier of the multiple first wireless signals. The method also includes transmitting, by the primary device, multiple second wireless signals, each second wireless signal having a second transmission range and encoded with a unique signal identifier of the multiple second wireless signals. The method further includes receiving, by a secondary device, the multiple first wireless signals when the secondary device is within the first transmission range. The method additionally includes receiving, by the secondary device, the multiple second wireless signals when the secondary device is within the second transmission range. The second transmission range is longer than the first transmission range.

Each first wireless signal may be further encoded with a unique device identifier of the primary device, and each second wireless signal may be further encoded with the unique device identifier of the primary device. The method may also include identifying, by the secondary device, a contact episode start time of a contact episode as the time at which the secondary device first receives a first wireless signal or a second wireless signal, whichever is received first, from the primary device, the contact episode start time indicating that the secondary device has come within the first transmission range or the second transmission range. The method may further include identifying, by the secondary device, a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range.

The method may also include transmitting, by the secondary device, a wireless monitoring signal encoded with the unique device identifier of the primary device and a unique device identifier of the secondary device at the contact episode end time.

The method may also include recording, by the secondary device, a first number representing the number of first wireless signals received by the secondary device during the contact episode. The method may further include recording, by the secondary device, a second number representing the number of second wireless signals received by the secondary device during the contact episode. The method may additionally include encoding, by the secondary device, the first number and the second number into the wireless monitoring signal.

The method may also include recording, by the secondary device, a signal-reception start time identical to the contact episode start time. The method may further include recording, by the secondary device, a signal-reception end time indicating the time at which the secondary device last receives a first wireless signal or a second wireless signal, whichever is received last, from the primary device during the contact episode. The method may additionally include encoding, by the secondary device, the signal-reception start time and the signal-reception end time into the wireless monitoring signal.

Alternatively, the method may also include recording, by the secondary device, a first contact start time indicating the time at which the secondary device first receives a first wireless signal from the primary device during the contact episode; and recording, by the secondary device, a first contact end time indicating the time at which the secondary device last receives a first wireless signal from the primary device during the contact episode. The method may further include recording, by the secondary device, a second contact start time indicating the time at which the secondary device first receives a second wireless signal from the primary device during the contact episode; and recording, by the secondary device, a second contact end time indicating the time at which the secondary device last receives a second wireless signal from the primary device during the contact episode. The method may additionally include encoding, by the secondary device, the first contact start time, the first contact end time, the second contact start time, and the second contact end time into the wireless monitoring signal.

The method may also include determining or estimating, by a server, from the first number and the second number, a first total contact time representing the total length of time during which the secondary device has been within the first transmission range, and a second total contact time representing the total length of time during which the secondary device has been between the first transmission range and the second transmission range.

The method may also include determining or estimating, by a server—from the first number, the second number, the signal-reception start time, and the signal-reception end time—a total signal-reception period representing the period within which signals have been received by the secondary device during the contact episode, and a total missed-signal number representing the total number of signals that have been missed by the secondary device during the contact episode.

The method may also include determining or estimating, by a server—from the first number, the second number, the first contact start time, the first contact end time, the second contact start time, and the second contact end time—a first signal-reception period representing the period within which first wireless signals have been received by the secondary device during the contact episode, a second signal-reception period representing the period within which second wireless signals have been received by the secondary device during the contact episode, a first missed-signal number representing the number of first wireless signals that have been missed by the secondary device during the contact episode, and a second missed-signal number representing the number of second wireless signals that have been missed by the secondary device during the contact episode.

The method may also include transmitting, by a location device, multiple wireless location signals, each wireless location signal having a location signal transmission range and encoded with a location identifier associated with the location device; and receiving, by the primary device, the multiple wireless location signals when the primary device is within the location signal transmission range. The method may further include deriving, by the primary device, the location identifier from at least one of the multiple wireless location signals received by the primary device; and transmitting, by the primary device, a wireless monitoring signal encoded with a unique device identifier of the primary device and the location identifier. The method may also include receiving, by the secondary device, the multiple wireless location signals when the secondary device is within the location signal transmission range. The method may further include deriving, by the secondary device, the location identifier from at least one of the multiple wireless location signals received by the secondary device; and transmitting, by the secondary device, a wireless monitoring signal encoded with a unique device identifier of the secondary device and the location identifier.

Each first wireless signal may be further encoded with a unique device identifier of the primary device, and each second wireless signal may be further encoded with the unique device identifier of the primary device. The method may also include identifying, by the secondary device, a contact episode start time of a contact episode as the time at which the secondary device first receives a first wireless signal from the primary device, the contact episode start time indicating that the secondary device has come within the first transmission range.

The method may also include generating, by the secondary device, one or more alert signals at the end of a second preset period immediately following a first preset period that starts from the contact episode start time, after the secondary device has determined that the time difference between the time at which the secondary device last receives a first wireless signal from the primary device during the first preset period and the contact episode start time is greater than or equal to a preset length of time.

Alternatively, the method may also include generating, by the secondary device, one or more alert signals at the end of a second preset period immediately following a first preset period that starts from the contact episode start time, after the secondary device has received at least a preset number of first wireless signals from the primary device during the first preset period.

The method may also include identifying, by the secondary device, a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range.

The method may also include generating, by the secondary device, one or more alert signals at the end of a third preset period immediately following the preset out-of-range period.

The method may also include transmitting, by the secondary device, a wireless monitoring signal encoded with the unique device identifier of the primary device and a unique device identifier of the secondary device at the contact episode end time.

The method may also include recording, by the secondary device, a contact start time identical to the contact episode start time. The method may further include recording, by the secondary device, a contact end time indicating the time at which the secondary device last receives a first wireless signal or a second wireless signal, whichever is received last, from the primary device during the contact episode. The method may additionally include encoding, by the secondary device, the contact start time and the contact end time into the wireless monitoring signal.

The method may also include determining or estimating, by a server, from the contact start time and the contact end time, a total signal-reception period representing the period within which signals have been received by the secondary device during the contact episode.

The method may also include encoding, by the primary device, the location identifier into the multiple first wireless signals and the multiple second wireless signals. The method may further include deriving, by the secondary device, the location identifier from at least one of the multiple wireless location signals received by the secondary device, from at least one of the multiple first wireless signals received by the secondary device, or from at least one of the multiple second wireless signals received by the secondary device.

The method may also include transmitting, by a location device, multiple near-range wireless location signals, each near-range wireless location signal having a near-range location signal transmission range and encoded with a location identifier associated with the location device and a unique signal identifier of the multiple near-range wireless location signals. The method may further include transmitting, by the location device, multiple medium-range wireless location signals, each medium-range wireless location signal having a medium-range location signal transmission range and encoded with the location identifier and a unique signal identifier of the multiple medium-range wireless location signals. The medium-range location signal transmission range may be longer than the near-range location signal transmission range. The method may also include receiving, by the secondary device, the multiple near-range wireless location signals when the secondary device is within the near-range location signal transmission range; and receiving, by the secondary device, the multiple medium-range wireless location signals when the secondary device is within the medium-range location signal transmission range.

The method may further include deriving, by the secondary device, the location identifier from at least one of the multiple near-range wireless location signals received by the secondary device but not from any one of the multiple medium-range wireless location signals received by the secondary device. The method may additionally include transmitting, by the secondary device, a wireless monitoring signal encoded with a unique device identifier of the secondary device and the location identifier.

The method may also include receiving, by the primary device, the multiple near-range wireless location signals when the primary device is within the near-range location signal transmission range; and receiving, by the primary device, the multiple medium-range wireless location signals when the primary device is within the medium-range location signal transmission range. The method may further include deriving, by the primary device, the location identifier from at least one of the multiple near-range wireless location signals received by the primary device but not from any one of the multiple medium-range wireless location signals received by the primary device. The method may additionally include encoding, by the primary device, the location identifier into the multiple first wireless signals and the multiple second wireless signals; and transmitting, by the primary device, a wireless monitoring signal encoded with a unique device identifier of the primary device and the location identifier. The method may also include deriving, by the secondary device, the location identifier from at least one of the multiple near-range wireless location signals received by the secondary device, from at least one of the multiple first wireless signals received by the secondary device, or from at least one of the multiple second wireless signals received by the secondary device, but not from any one of the multiple medium-range wireless location signals received by the secondary device.

The method may also include receiving, by the primary device, the multiple near-range wireless location signals when the primary device is within the near-range location signal transmission range; and receiving, by the primary device, the multiple medium-range wireless location signals when the primary device is within the medium-range location signal transmission range. The method may further deriving, by the primary device, the location identifier from at least one of the multiple near-range wireless location signals received by the primary device or from at least one of the multiple medium-range wireless location signals received by the primary device, and encoding, by the primary device, the location identifier into the multiple first wireless signals and the multiple second wireless signals. The method may additionally include transmitting, by the primary device, a wireless monitoring signal encoded with a unique device identifier of the primary device and the location identifier. The method may also include deriving, by the secondary device, the location identifier from at least one of the multiple near-range wireless location signals received by the secondary device, from at least one of the multiple first wireless signals received by the secondary device, or from at least one of the multiple second wireless signals received by the secondary device, but not from any one of the multiple medium-range wireless location signals received by the secondary device.

Each first wireless signal may be further encoded with a location identifier associated with the primary device, and each second wireless signal may be further encoded with the location identifier. The method may also include recording, by the secondary device, a first number representing the number of first wireless signals received by the secondary device during a preset tracking period; and recording, by the secondary device, a second number representing the number of second wireless signals received by the secondary device during the preset tracking period.

The method may also include deriving, by the secondary device, the location identifier from at least one of the multiple first wireless signals received by the secondary device or from at least one of the multiple second wireless signals received by the secondary device. The method may further include transmitting, by the secondary device, a wireless monitoring signal encoded with a unique device identifier of the secondary device, the location identifier, the first number, and the second number.

The method may also include recording, by the secondary device, a first contact end time indicating the time at which the secondary device last receives a first wireless signal from the primary device during the preset tracking period. The method may further include recording, by the secondary device, a second contact end time indicating the time at which the secondary device last receives a second wireless signal from the primary device during the preset tracking period. The method may additionally include encoding, by the secondary device, the first contact end time and the second contact end time into the wireless monitoring signal.

The method may also include recording, by the secondary device, a first contact start time indicating the time at which the secondary device first receives a first wireless signal from the primary device during the preset tracking period. The method may further include recording, by the secondary device, a second contact start time indicating the time at which the secondary device first receives a second wireless signal from the primary device during the preset tracking period. The method may additionally include encoding, by the secondary device, the first contact start time and the second contact start time into the wireless monitoring signal.

The method may also include determining or estimating, by a server, from the first number and the second number, whether the secondary device has been within the first transmission range or between the first transmission range and the second transmission range.

The method may also include determining or estimating, by a server—from the first contact end time and the second contact end time, or from the first number, the second number, the first contact end time, and the second contact end time—whether the secondary device has been within the first transmission range or between the first transmission range and the second transmission range.

The method may also include determining or estimating, by a server—from the first number, the second number, the first contact start time, the first contact end time, the second contact start time, and the second contact end time—a first signal-reception period representing the period within which first wireless signals have been received by the secondary device during the preset tracking period, a second signal-reception period representing the period within which second wireless signals have been received by the secondary device during the preset tracking period, a first missed-signal number representing the number of first wireless signals that have been missed by the secondary device during the preset tracking period, and a second missed-signal number representing the number of second wireless signals that have been missed by the secondary device during the preset tracking period.

Each first wireless signal may be further encoded with a location identifier associated with the primary device, and each second wireless signal may be further encoded with the location identifier. The method may also include deriving, by the secondary device, the location identifier from at least one of the multiple first wireless signals received by the secondary device but not from any one of the multiple second wireless signals received by the secondary device. The method may further include transmitting, by the secondary device, one or more signals each encoded with a unique device identifier of the secondary device and the location identifier.

Alternatively, the method may also include deriving, by the secondary device, the location identifier from at least one of the multiple first wireless signals received by the secondary device or from at least one of the multiple second wireless signals received by the secondary device. The method may further include transmitting, by the secondary device, one or more signals each encoded with a unique device identifier of the secondary device and the location identifier.

Application information. Although the above invention has been described with reference to applications in hospital settings, it can in general be used in any application that requires location tracking or proximity detection, in both hospital and non-hospital settings.

The invention claimed is:

1. A system for location tracking or proximity detection, the system comprising
 a primary device configured to transmit multiple first wireless signals, each first wireless signal having a first transmission range and encoded with a unique signal identifier of the multiple first wireless signals, and multiple second wireless signals, each second wireless signal having a second transmission range and encoded with a unique signal identifier of the multiple second wireless signals, wherein the second transmission range is longer than the first transmission range; and
 a secondary device configured to
   store a unique device identifier of the secondary device,
   receive the multiple first wireless signals when the secondary device is within the first transmission range, and
   receive the multiple second wireless signals when the secondary device is within the second transmission range;
 wherein
 the primary device is further configured to store a unique device identifier of the primary device and encode the unique device identifier of the primary device into each of the multiple first wireless signals and each of the multiple second wireless signals; and
 the secondary device is further configured to
 identify a contact episode start time of a contact episode as the time at which the secondary device first receives a first wireless signal or a second wireless signal, whichever is received first, from the primary device, the contact episode start time indicating that the secondary device has come within the first transmission range or the second transmission range; and
 identify a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range.

2. The system of claim 1, wherein the secondary device is further configured to transmit a wireless monitoring signal encoded with the unique device identifier of the primary device and the unique device identifier of the secondary device at the contact episode end time.

3. The system of claim 2, wherein the secondary device is further configured to
 record a first number representing the number of first wireless signals received by the secondary device during the contact episode,
 record a second number representing the number of second wireless signals received by the secondary device during the contact episode, and
 encode the first number and the second number into the wireless monitoring signal.

4. The system of claim 3, wherein the secondary device is further configured to
 record a signal-reception start time identical to the contact episode start time;
 record a signal-reception end time indicating the time at which the secondary device last receives a first wireless signal or a second wireless signal, whichever is received last, from the primary device during the contact episode; and
 encode the signal-reception start time and the signal-reception end time into the wireless monitoring signal.

5. The system of claim 3, wherein the secondary device is further configured to
 record a first contact start time indicating the time at which the secondary device first receives a first wireless signal from the primary device during the contact episode;
 record a first contact end time indicating the time at which the secondary device last receives a first wireless signal from the primary device during the contact episode;
 record a second contact start time indicating the time at which the secondary device first receives a second wireless signal from the primary device during the contact episode;
 record a second contact end time indicating the time at which the secondary device last receives a second wireless signal from the primary device during the contact episode; and
 encode the first contact start time, the first contact end time, the second contact start time, and the second contact end time into the wireless monitoring signal.

6. The system of claim 3, further comprising a server configured to determine or estimate, from the first number and the second number,
 a first total contact time representing the total length of time during which the secondary device has been within the first transmission range, and
 a second total contact time representing the total length of time during which the secondary device has been between the first transmission range and the second transmission range.

7. The system of claim 4, further comprising a server configured to determine or estimate—from the first number, the second number, the signal-reception start time, and the signal-reception end time—
 a total signal-reception period representing the period within which signals have been received by the secondary device during the contact episode, and
 a total missed-signal number representing the total number of signals that have been missed by the secondary device during the contact episode.

8. The system of claim 5, further comprising a server configured to determine or estimate—from the first number, the second number, the first contact start time, the first contact end time, the second contact start time, and the second contact end time—
- a first signal-reception period representing the period within which first wireless signals have been received by the secondary device during the contact episode,
- a second signal-reception period representing the period within which second wireless signals have been received by the secondary device during the contact episode,
- a first missed-signal number representing the number of first wireless signals that have been missed by the secondary device during the contact episode, and
- a second missed-signal number representing the number of second wireless signals that have been missed by the secondary device during the contact episode.

9. A system for location tracking or proximity detection, the system comprising
- a primary device configured to transmit multiple first wireless signals, each first wireless signal having a first transmission range and encoded with a unique signal identifier of the multiple first wireless signals, and multiple second wireless signals, each second wireless signal having a second transmission range and encoded with a unique signal identifier of the multiple second wireless signals, wherein the second transmission range is longer than the first transmission range; and
- a secondary device configured to
  - store a unique device identifier of the secondary device,
  - receive the multiple first wireless signals when the secondary device is within the first transmission range, and
  - receive the multiple second wireless signals when the secondary device is within the second transmission range; and
- a location device configured to store a location identifier associated with the location device and transmit multiple wireless location signals, each wireless location signal having a location signal transmission range and encoded with the location identifier, wherein
- the primary device is further configured to receive the multiple wireless location signals when the primary device is within the location signal transmission range, derive the location identifier from at least one of the multiple wireless location signals received by the primary device, and transmit a wireless monitoring signal encoded with the unique device identifier of the primary device and the location identifier; and
- the secondary device is further configured to receive the multiple wireless location signals when the secondary device is within the location signal transmission range, derive the location identifier from at least one of the multiple wireless location signals received by the secondary device, and transmit a wireless monitoring signal encoded with the unique device identifier of the secondary device and the location identifier.

10. A system for location tracking or proximity detection, the system comprising
- a primary device configured to transmit multiple first wireless signals, each first wireless signal having a first transmission range and encoded with a unique signal identifier of the multiple first wireless signals, and multiple second wireless signals, each second wireless signal having a second transmission range and encoded with a unique signal identifier of the multiple second wireless signals, wherein the second transmission range is longer than the first transmission range; and
- a secondary device configured to
  - store a unique device identifier of the secondary device,
  - receive the multiple first wireless signals when the secondary device is within the first transmission range, and
  - receive the multiple second wireless signals when the secondary device is within the second transmission range;
- wherein
- the primary device is further configured to store a unique device identifier of the primary device and encode the unique device identifier of the primary device into each of the multiple first wireless signals and each of the multiple second wireless signals; and
- the secondary device is further configured to identify a contact episode start time of a contact episode as the time at which the secondary device first receives a first wireless signal from the primary device, the contact episode start time indicating that the secondary device has come within the first transmission range.

11. The system of claim 10, wherein the secondary device is further configured to generate one or more alert signals at the end of a second preset period immediately following a first preset period that starts from the contact episode start time, after the secondary device has determined that the time difference between the time at which the secondary device last receives a first wireless signal from the primary device during the first preset period and the contact episode start time is greater than or equal to a preset length of time.

12. The system of claim 10, wherein the secondary device is further configured to generate one or more alert signals at the end of a second preset period immediately following a first preset period that starts from the contact episode start time, after the secondary device has received at least a preset number of first wireless signals from the primary device during the first preset period.

13. The system of claim 10, wherein the secondary device is further configured to identify a contact episode end time of the contact episode as the end of a preset out-of-range period during which the secondary device does not receive any first wireless signal and does not receive any second wireless signal from the primary device, the preset out-of-range period being the period during which the secondary device is outside the second transmission range.

14. The system of claim 13, wherein the secondary device is further configured to generate one or more alert signals at the end of a third preset period immediately following the preset out-of-range period.

15. The system of claim 13, wherein the secondary device is further configured to transmit a wireless monitoring signal encoded with the unique device identifier of the primary device and the unique device identifier of the secondary device at the contact episode end time.

16. The system of claim 15, wherein the secondary device is further configured to
- record a contact start time identical to the contact episode start time;
- record a contact end time indicating the time at which the secondary device last receives a first wireless signal or a second wireless signal, whichever is received last, from the primary device during the contact episode; and
- encode the contact start time and the contact end time into the wireless monitoring signal.

17. The system of claim 16, further comprising a server configured to determine or estimate, from the contact start time and the contact end time, a total signal-reception period representing the period within which signals have been received by the secondary device during the contact episode.

18. A system for location tracking or proximity detection, the system comprising
- a primary device configured to transmit multiple first wireless signals, each first wireless signal having a first transmission range and encoded with a unique signal identifier of the multiple first wireless signals, and multiple second wireless signals, each second wireless signal having a second transmission range and encoded with a unique signal identifier of the multiple second wireless signals, wherein the second transmission range is longer than the first transmission range; and
- a secondary device configured to
  - store a unique device identifier of the secondary device,
  - receive the multiple first wireless signals when the secondary device is within the first transmission range, and
  - receive the multiple second wireless signals when the secondary device is within the second transmission range; and
- a location device configured to store a location identifier associated with the location device and transmit
- multiple near-range wireless location signals, each near-range wireless location signal having a near-range location signal transmission range and encoded with the location identifier and a unique signal identifier of the multiple near-range wireless location signals, and
- multiple medium-range wireless location signals, each medium-range wireless location signal having a medium-range location signal transmission range and encoded with the location identifier and a unique signal identifier of the multiple medium-range wireless location signals;
- wherein
- the medium-range location signal transmission range is longer than the near-range location signal transmission range; and
- the secondary device is further configured to
  - receive the multiple near-range wireless location signals when the secondary device is within the near-range location signal transmission range,
  - receive the multiple medium-range wireless location signals when the secondary device is within the medium-range location signal transmission range,
  - derive the location identifier from at least one of the multiple near-range wireless location signals received by the secondary device but not from any one of the multiple medium-range wireless location signals received by the secondary device, and
  - transmit a wireless monitoring signal encoded with the unique device identifier of the secondary device and the location identifier.

19. A system for location tracking or proximity detection, the system comprising
- a primary device configured to transmit multiple first wireless signals, each first wireless signal having a first transmission range and encoded with a unique signal identifier of the multiple first wireless signals, and multiple second wireless signals, each second wireless signal having a second transmission range and encoded with a unique signal identifier of the multiple second wireless signals, wherein the second transmission range is longer than the first transmission range; and
- a secondary device configured to
  - store a unique device identifier of the secondary device,
  - receive the multiple first wireless signals when the secondary device is within the first transmission range, and
  - receive the multiple second wireless signals when the secondary device is within the second transmission range; and
- wherein the primary device is further configured to store a location identifier associated with the primary device and encode the location identifier into each of the multiple first wireless signals and each of the multiple second wireless signals.

* * * * *